US008204776B2

(12) United States Patent  (10) Patent No.: US 8,204,776 B2
Abhyanker  (45) Date of Patent: *Jun. 19, 2012

(54) POLLING IN A GEO-SPATIAL ENVIRONMENT

(75) Inventor: Raj Vasant Abhyanker, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/897,088

(22) Filed: Aug. 28, 2007

(65) Prior Publication Data

US 2009/0063252 A1    Mar. 5, 2009

(51) Int. Cl.
*G06Q 10/00* (2006.01)
(52) U.S. Cl. ................... 705/7.32; 705/7.34
(58) Field of Classification Search ............ 705/7.32, 705/7.34
See application file for complete search history.

(56) References Cited

U.S. PATENT DOCUMENTS

| 8,064,590 | B2 | 11/2011 | Abhyanker |
| 2002/0029163 | A1 | 3/2002 | Joao |
| 2002/0029179 | A1 | 3/2002 | Gruber et al. |
| 2002/0073026 | A1 | 6/2002 | Gruber et al. |
| 2002/0194060 | A1 | 12/2002 | Chernomorov |
| 2003/0023586 | A1* | 1/2003 | Knorr ............... 707/3 |
| 2003/0154213 | A1* | 8/2003 | Ahn ............ 707/103 X |
| 2003/0208423 | A1 | 11/2003 | Shotey et al. |
| 2005/0159998 | A1 | 7/2005 | Buyukkokten et al. |
| 2005/0273804 | A1 | 12/2005 | Preisman |
| 2006/0009994 | A1 | 1/2006 | Hogg et al. |
| 2006/0085248 | A1 | 4/2006 | Arnett et al. |
| 2006/0149620 | A1 | 7/2006 | Reed et al. |
| 2006/0218153 | A1* | 9/2006 | Voon et al. ............... 707/10 |
| 2007/0136171 | A1 | 6/2007 | Lepere |
| 2007/0143128 | A1 | 6/2007 | Tokarev et al. |
| 2008/0077642 | A1* | 3/2008 | Carbone et al. ........ 707/E17.14 |
| 2008/0294678 | A1* | 11/2008 | Gorman et al. ............ 707/102 |
| 2008/0307053 | A1* | 12/2008 | Mitnick et al. .............. 709/205 |
| 2009/0284530 | A1 | 11/2009 | Lester et al. |

FOREIGN PATENT DOCUMENTS

WO    WO-2006076472 A2    7/2006

OTHER PUBLICATIONS

Facebook—Polls, http://www.facebook.com/help.php?page=30.
CINCIForums, http://www.cinciforums.com/.
New Way to Show Poll Result (GD) PHP, http://www.zaheema.com/forum/help/71-new-way-show-poll-result-gd-php.html.

(Continued)

*Primary Examiner* — Mark Fleischer

(57) ABSTRACT

A method, apparatus and system of polling in a geo-spatial environment are disclosed. In one embodiment, a method includes generating a community network of user profiles, each user profile associated with a specific geographic location, determining a geographic region associated with a neighborhood, determining a first group of user profiles, the specific geographic location of each user profile associated with the geographic region, generating a first play view to include a three-dimensional map view embodied by the community network and the first group of the user profiles represented at locations in the three-dimensional map view associated with the specific geographic location of each user profile, generating a poll associated with the first group of user profiles and receiving poll results associated with the poll via a communication mode. The method may also include automatically tabulating the poll results and publishing, via the communication mode, the poll results.

16 Claims, 26 Drawing Sheets

OTHER PUBLICATIONS

How do I create a poll?, http://help.orkut.com/bin/answer.py?hl=en&answer=60493.

"Following the Dollars: Map Political Campaign Contributions in Your Area", retrieved from http://www.cs.indiana.edu/~markane/i590/contributors.html, 2 pages.

"Usiza", Usiza Corporation, 2007, retrieved from http://www.usiza.com/AboutUs.aspx, 1 page.

"Fundcare 2004: Neighbor Search", Eyebeam R&D, retrieved on Jun. 26, 2007 from hdp://www.fundrace.org/neighbors.php, 1 page.

"Social Network Fundraising—a new (old) approach?", Fundraising Innovation, 2007, retrieved on Jun. 26, 2007 from http://www.fundraisinginnovation.com/2005/02/20/social-network-fundraising-a-new-old-approach/, 3 pages.

* cited by examiner

FIGURE 8

SAN FRANCISCO POLL GROUP INVITATION

POLL GROUP INVITATION 1302

NAME OF MODERATOR: ERICA LEE

MODERATOR USER PROFILE INFO:
ERICA LEE
21577 VILLA MARIA COURT
CUPERTINO, CA
95015
UNITED STATES
ELEE@POLLSTER.COM

MESSAGE: WE CORDIALLY INVITE YOU TO JOIN THE SAN FRANCISCO POLL GROUP. THE SAN FRANCISCO POLL GROUP IS A PART OF COMMUNITY NETWORK BASED WITHIN SAN FRANCISCO. ITS MEMBERS RECEIVE AND RESPOND TO VARIOUS POLLS. THE POLLS, FOR EXAMPLE, MAY INCLUDE QUESTIONS RELATED TO OR BASED ON SUBJECTS SUCH AN INTEREST, A POLITICAL SUBJECT, OR A NEIGHBORHOOD ISSUE.

MEMBER OF SAN FRANCISCO POLL GROUP MAY CREATE AND SEND THEIR OWN POLLS VIA THE MODERATOR (ERICA LEE).

RESULTS OF POLLS MAY AUTOMATICALLY TABULATED, AND MAY BE PUBLISHED VIA VARIOUS COMMUNICATION MODES, INCLUDING WEBPAGE, EMAIL, PHYSICAL MAIL, AND NEWSPAPER. IN ADDITION, THE COMMUNITY NETWORK MAY HAVE ACCESS TO RELATED WEBPAGES SUCH AS ELECTION UPDATES AND RESULTS, POLITICAL CANDIDATE PAGES, AND MORE.

THERE IS NO COST TO JOIN AND NO DUES. MEMBERS MAY WITHDRAW AT ANY TIME.

WOULD YOU LIKE TO JOIN THE GROUP NOW?
YES. PLEASE SUBMIT MY RESPONSE AND ADD ME TO THE GROUP. ●
PLEASE SEND EMAIL CONFIRMATION OF MEMBERSHIP.
NO, THANK YOU. ○
NOT AT THIS TIME. ○

SEND

| USERS 2102 | MODERATOR 2104 | POLL GROUPS 2106 | CANDIDATE 2108 | PARTY AFFILIATION 2110 |
|---|---|---|---|---|
| ERICA LEE | YES | 2 | NO | DEMOCRATIC |
| GEORGE SMITH | NO | 3 | YES | REPUBLICAN |
| KERRY HALEY | NO | 0 | YES | DEMOCRATIC |
| • | • | • | • | • |
| • | • | • | • | • |
| • | • | • | • | • |

POLLING IN A GEO-SPATIAL ENVIRONMENT

FIELD OF TECHNOLOGY

This disclosure relates generally to the technical field of communications, and in one embodiment, to a method, apparatus and system of polling in a geo-spatial environment.

BACKGROUND

People may be interested in their neighbors. People may want to know opinions and/or views of the neighbors to determine which local associations and/or activities may interest them. People may want to gather local demographics to reach a neighborhood consensus on an issue.

People may also wish to know their neighbors' political opinions. Candidates in local elections may want to know which issues, political affiliations, and/or platforms are important to a local constituency. The candidates and the neighborhood may want to be informed of election results, individual voter profiles and/or substance of each vote.

Such information may be hard to gather. Meeting and getting to know the neighbors may be time-consuming. One may have to walk door to door in the neighborhood (e.g., to homes and/or businesses, etc.), and the information, if ascertained, may not be timely.

SUMMARY

A method, apparatus and system of polling in a geo-spatial environment are disclosed. In one aspect, a method includes generating a community network of user profiles, each user profile associated with a specific geographic location, determining a geographic region associated with a neighborhood, determining a first group of user profiles, the specific geographic location of each user profile associated with the geographic region, generating a first display view to include a three-dimensional map view embodied by the community network and the first group of the user profiles represented at locations in the three-dimensional map view associated with the specific geographic location, generating a poll associated with at least the first group of user profiles, and receiving poll results associated with the poll via a communication mode.

The poll may be associated with a category selected from a group including an interest, a political subject (e.g., an election, a political party, a political issue, a platform, a candidate, and/or a vote, etc.) and/or a neighborhood issue, etc. The communication mode may include an online mode (e.g., a webpage, an email, an instant message, and/or telephone, etc.) and/or a physical mode (e.g., a physical mailing and/or a newspaper, etc.).

The method may also include automatically tabulating the poll results and publishing the poll results via the communication mode. The method may further include generating a second display view to include a three-dimensional map view embodied by the community network, a second group of user profiles represented at locations in the three-dimensional map view associated with the specific geographic location, and the poll results, each poll result associated with a user profile (e.g., of the second group of user profiles).

In addition, the method may include publishing the poll results to include respondents' names, a response associated with each respondent, a response category, and/or a percentage associated with the response category. The method may also include visualizing a poll group. The method may further include determining a geographic region associated with a neighborhood, determining a third group of user profiles (e.g., the specific geographic location of each user profile may be associated with the geographic region), and generating a third display view to include a three-dimensional map view embodied by the community network and the third group of the user profiles represented at locations in the three-dimensional map view associated with the specific geographic location.

In addition, the method may include forming a poll group associated with at least a portion of the third group of user profiles. The method may also include generating poll group invitations, each poll group invitation associated with a user profile of the third group of user profiles, and receiving poll group responses associated with the poll group invitations. The method may include generating with the poll, a claim invitation associated with claiming an unclaimed user profile of the first group of user profiles. The method may further include authenticating an email address associated with the unclaimed user profile, and enabling a claim of the unclaimed user profile.

The method may also include providing search categories (e.g., may include elections, candidates, debates, elected officials, neighborhood groups, and/or neighbor profiles, etc.), selecting at least one search category, generating a search of the user profiles based on the search category, and displaying, in the three-dimensional map view, the user profiles matching the search category, represented at locations in the three-dimensional map view associated with the specific geographic location.

In another aspect, a system includes a geo-spatial environment, a community network module of the geo-spatial environment, to include user profiles, each user profile to include a specific geographic location, a geographic region module of the geo-spatial environment to determine a geographic region (e.g., based on a street address associated with a user profile, a city, a county, a state, and/or a country, etc.), a group module of the geo-spatial environment to determine a first group of user profiles, the specific geographic location of each user profile associated with the geographic region, a map module of the geo-spatial environment to include map data which serves as a basis to render a three-dimensional map view in the geo-spatial environment which identifies residences, businesses, and/or civic structures having specific geographic locations.

The system also includes a display module of the geo-spatial environment to generate a first display view of the three-dimensional map view embodied by the community network and the first group of user profiles, each user profile represented at a location in the three-dimensional map view corresponding to the associated specific geographic location, and a poll module of the geo-spatial environment to generate a poll associated with the first group of user profiles and to receive poll results (e.g., may include respondents' names, a response associated with each respondent, a response category, and/or a percentage associated with the response category, etc.) associated with the poll via a communication mode. The poll may be associated with a category selected from a group including an interest, a political subject (e.g., an election, a political party, a political issue, a platform, a candidate, and/or a vote, etc.), and/or a neighborhood issue. The communication mode may include an online mode (e.g., a webpage, an email, an instant message, and/or telephone, etc.) and/or a physical mode (e.g., a physical mailing and/or a newspaper, etc.).

The system may also include a tabulate module of the geo-spatial environment to automatically tabulate the poll results, and a publish module of the geo-spatial environment to publish the poll results via the communication mode. In addition, the system may include a webpage module of the geo-spatial environment to generate a webpage associated with a second display view to include a three-dimensional map view embodied by the community network, a second group of user profiles associated with the poll results, each user profile represented at a location in the three-dimensional map view corresponding to the associated specific geographic location, and the poll results, each poll result associated with a user profile (e.g., of the second group of user profiles).

The system may further include a visualize module of the geo-spatial environment to enable visualization of a poll group associated with a particular geographic region. In addition, the system may include a group generator module of the geo-spatial environment to generate poll group invitations, each poll group invitation associated with a user profile of a third group of user profiles, and to receive poll group responses associated with the poll group invitations.

The system may also include a claim invitation module of the geo-spatial environment to generate, with the poll, a claim invitation associated with an unclaimed user profile of the first group of user profiles and a claim user profile module of the geo-spatial environment to authenticate an email address associated with the unclaimed user profile and to enable a claim of the unclaimed user profile.

The system may further include a search module of the geo-spatial environment to generate search categories (e.g., may include elections, candidates, debates, elected officials, neighborhood groups, and/or neighbor profiles, etc.) and to search the user profiles based on at least one search category. In addition, the system may include a wiki profile module of the geo-spatial environment to generate, in the display view, a wiki profile associated with a user profile and an append module of the geo-spatial environment to generate, with the wiki profile, content associated with the wiki profile.

In yet another aspect, a geo-spatial environment includes a first instruction set to enable a community network, to include a map database associated with map data and a user database associated with user profiles, each user profile associated with a specific geographic location identifiable in the map data, a second instruction set integrated with the first instruction set to determine a geographic region associated with a neighborhood, and a third instruction set integrated with the first instruction set and the second instruction set to generate a group of user profiles, the specific geographic location of each user profile associated with the geographic region.

The geo-spatial environment also includes a fourth instruction set integrated with the first instruction set, the second instruction set and the third instruction set to display a three-dimensional map view embodied by the community network and the group of user profiles represented at locations in the three-dimensional map view corresponding to the associated specific geographic location, and a fifth instruction set integrated with the first instruction set, the second instruction set, the third instruction set and the fourth instruction set to generate a poll associated with the group of user profiles via a communication mode. The geo-spatial environment may further include a sixth instruction set to visualize a poll group and to form a poll group and a seventh instruction set to generate a search of the user profiles based on at least one search category.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 8 is a user interface view displaying poll information communicated to the users, according to one embodiment.

FIG. 13 is a user interface view displaying a poll group invitation, according to one embodiment.

FIG. 16 is a user interface view displaying candidates running in a City Council election, according to one embodiment.

Figure 1:
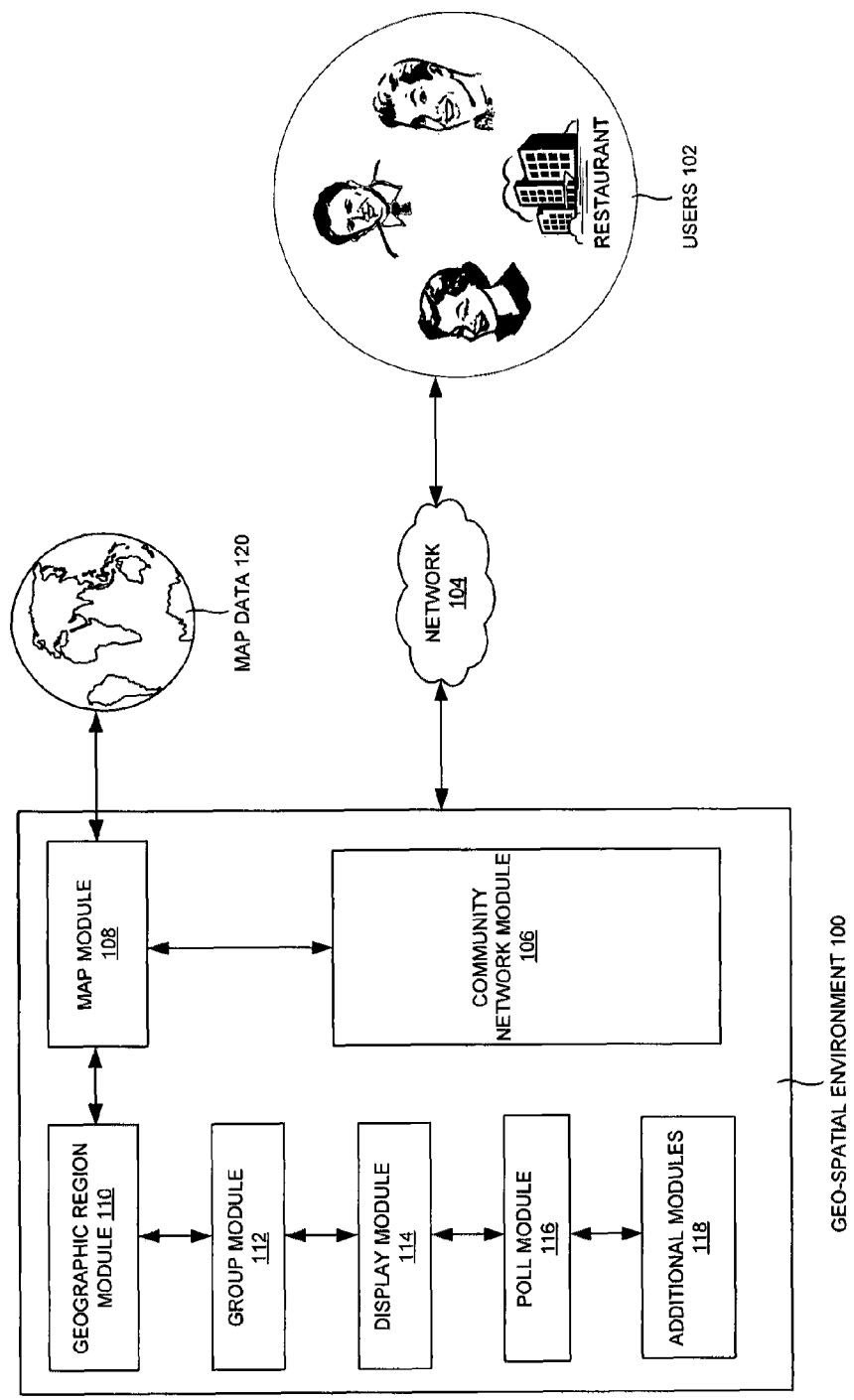
FIG. 1 is a system view of a geo-spatial environment communicating with users through a network, according to one embodiment.

Other features of the present embodiments will be apparent from the accompanying drawings and from the detailed description that follows.

DETAILED DESCRIPTION

A method, apparatus and system of polling in a geo-spatial environment are disclosed. In the following description, for the purposes of explanation, numerous specific details are set forth in order to provide a thorough understanding of the various embodiments. It will be evident, however, to one skilled in the art that the various embodiments may be practiced without these specific details.

In one embodiment, a method includes generating a community network (e.g., the community network 200 of FIG. 2) of user profiles (e.g., the user profiles 204 of FIG. 2), each user profile 204 associated with a specific geographic location (e.g., the specific geographic location 206 of FIG. 2), determining a geographic region (e.g., the geographic region 412 of FIG. 4) associated with a neighborhood, and determining a first group of user profiles (e.g., the first group of user profiles 204A of FIG. 4), the specific geographic location 206 of each user profile 204 associated with the geographic region 412.

Figure 4:
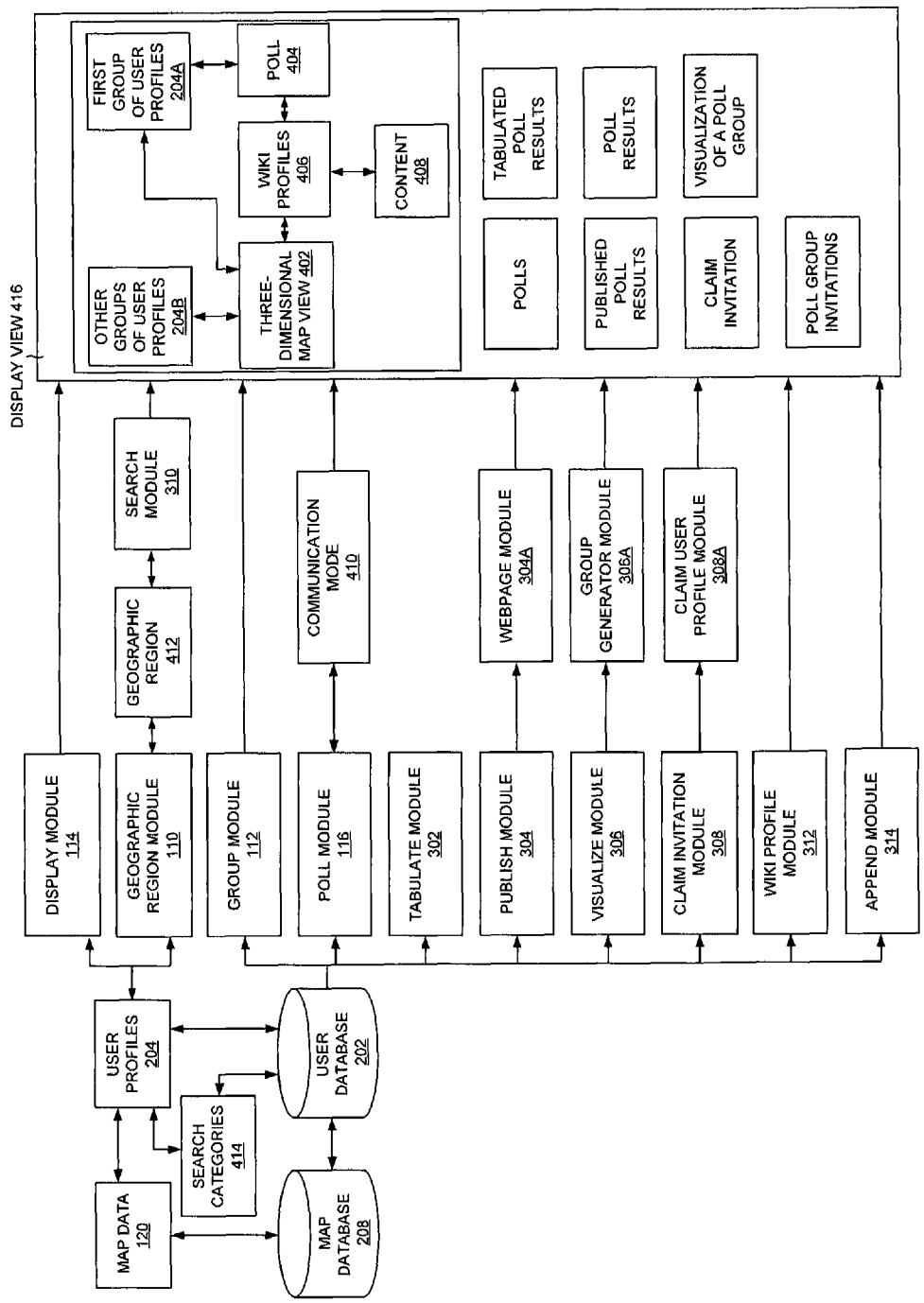
FIG. 4 is a block diagram illustrating generation of a display view associated with a poll, according to one embodiment.

The method also includes generating a first display view (e.g., the display view 416 of FIG. 4) to include a three-dimensional map view (e.g., the three-dimensional map view 402 of FIG. 4) embodied by the community network 200 and the first group of user profiles 204A represented at locations in the three-dimensional map view 402 associated with the specific geographic location 206, generating a poll (e.g., the poll 404 of FIG. 4) associated with the first group of user profiles 204A, and receiving poll results (e.g., the poll results 516 of FIG. 5) associated with the poll 404 via a communication mode (e.g., the communication mode 410 of FIG. 4).

In another embodiment, a system includes a geo-spatial environment (e.g., the geo-spatial environment 100 of FIG. 1), a community network module (e.g., the community network module 106 of FIG. 1) of the geo-spatial environment 100, to include user profiles (e.g., the user profiles 204 of FIG. 2), each user profile 204 to include a specific geographic location (e.g., the specific geographic location 206 of FIG. 2), a geographic region module (e.g., the geographic region module 110 of FIG. 1) of the geo-spatial environment 100 to determine a geographic region (e.g., the geographic region 412 of FIG. 4), and a group module (e.g., the group module 112 of FIG. 1) of the geo-spatial environment 100 to determine a first group of user profiles (e.g., the first group of user profiles 204A of FIG. 4), the specific geographic location 206 of each user profile 204 associated with the geographic region 412.

The system also includes a map module (e.g., the map module 108 of FIG. 1) of the geo-spatial environment 100 to include map data (e.g., the map data 120 of FIG. 1) which serves as a basis to render a three-dimensional map view (e.g., the three-dimensional map view 402 of FIG. 4) in the geo-spatial environment 100 which identifies residences, businesses, and/or civic structures having specific geographic locations 206, a display module (e.g., the display module 114 of FIG. 1) of the geo-spatial environment 100 to generate a first display view (e.g., the display view 416 of FIG. 4) of the three-dimensional map view 402 embodied by the community network 200 and the first group of user profiles 204A, each user profile 204 represented at a location in the three-dimensional map view 402 corresponding to the associated specific geographic location 206, and a poll module (e.g., the poll module 116 of FIG. 1) of the geo-spatial environment to generate a poll (e.g., the poll 404 of FIG. 4) associated with the first group of user profiles 204A and to receive poll results (e.g., the poll results 516 of FIG. 5) associated with the poll 404 via a communication mode (e.g., the communication mode 410 of FIG. 4).

In yet another embodiment, a geo-spatial environment (e.g., the geo-spatial environment 100 of FIG. 1) includes a first instruction set to enable a community network (e.g., the community network 200 of FIG. 2), to include a map database (e.g., the map database 208 of FIG. 2) associated with map data (e.g., the map data 120 of FIG. 1) and a user database (e.g., the user database 202 of FIG. 2) associated with user profiles (e.g., the user profiles 204 of FIG. 2), each user profile 204 associated with a specific geographic location (e.g., the specific geographic location 206 of FIG. 2) identifiable in the map data 120, a second instruction set integrated with the first instruction set to determine a geographic region (e.g., the geographic region 412 of FIG. 4) associated with a neighborhood, and a third instruction set integrated with the first instruction set and the second instruction set to generate a group of user profiles (e.g., the first group of user profiles 204A, the other groups of user profiles 204B of FIG. 4), the specific geographic location 206 of each user profile 204 associated with the geographic region 412.

The geo-spatial environment 100 also includes a fourth instruction set integrated with the first instruction set, the second instruction set and the third instruction set to display a three-dimensional map view (e.g., the three-dimensional map view 402 of FIG. 4) embodied by the community network 200 and the group of user profiles 204 represented at locations in the three-dimensional map view 402 corresponding to the associated specific geographic location 206, and a fifth instruction set integrated with the first instruction set, the second instruction set, the third instruction set and the fourth instruction set to generate a poll (e.g., the poll 404 of FIG. 4) via a communication mode (e.g., the communication mode 410 of FIG. 4) associated with the group of user profiles 204.

FIG. 1 is a system view of a geo-spatial environment 100 communicating with users 102 through a network 104, according to one embodiment. Particularly, FIG. 1 illustrates the geo-spatial environment 100, the users 102, the network 104, a community network module 106, a map module 108, a geographic region module 110, a group module 112, a display module 114, a poll module 116, additional modules 118 and map data 120, according to one embodiment.

The geo-spatial environment 100 may enable polling among the users 102 based on specific geographic regions. The users 102 may be entities (e.g., individuals, businesses, etc.) associated with user profiles 204 of a community network 200 having specific geographic locations 206 in the geo-spatial environment 100. For example, the user profiles 204 may include information such as a name, contact information (e.g., phone number, email address, etc.), picture, and/or other personal information. The network 104 may facilitate communication between the users 102 and the geo-spatial environment 100.

The community network module 106 may generate the community network 200 that includes the user profiles 204 associated with the specific geographic locations 206 in the geo-spatial environment 100. For example, the users 102 of the geo-spatial environment 100 may form the community network 200 based on the specific geographic location 206 associated with their user profiles 204. The map module 108 may generate a three-dimensional map view (e.g., the three-dimensional map view 402 of FIG. 4) that includes physical structures having the specific geographic location 206 in the geo-spatial environment 100. For example, the physical structures may include businesses, residences, and/or civic structures, etc.

The geographic region module 110 may determine a geographic region (e.g., the geographic region 412 of FIG. 4) associated with the specific geographic locations 206 of the user profiles 204. For example, the geographic region 412 associated with the user profiles 204 may be identified based on a latitudinal and longitudinal coordinates. The group module 112 may determine a group of user profiles (e.g., the first group of user profiles 204A, the other groups of user profiles 204B of FIG. 4) having the specific geographic locations 206 associated with the geographic region 412. In one embodiment, the group of user profiles 204 is associated with a poll (e.g., the poll 404 of FIG. 4) in the geo-spatial environment 100. For example, the first group of user profiles 204A may include a moderator who generates a poll 404, sends the poll 404 to neighbors, and/or forms a poll group, etc.

The display module 114 may process (e.g., generates, tracks, captures, stores and/or analyzes, etc.) a three-dimensional map view 402 displaying the group(s) of user profiles 204 represented at a location corresponding to an associated specific geographic location 206. The poll module 116 may generate a poll 404 associated with the group of user profiles 204. For example, the poll 404 may be generated via a communication mode (e.g., the communication mode 410 of FIG. 4) that includes a physical mode and/or an online mode. The poll 404 may be associated with categories such as interests, political subjects and/or neighborhood issues.

The poll module 116 may also receive poll results (e.g., the poll results 516 of FIG. 5) associated with the poll 404 via the communication mode 410. For example, the poll results 516 may include respondent's names, a response associated with each respondent, a response category and/or a percentage associated with the response category, etc. The additional modules 118 may generate additional processes associated with polling in the geo-spatial environment 100. The map data 120 may serve as a basis to generate and identify physical structures (e.g., associated with the groups of user profiles 204) in the three-dimensional map view 402.

In the example embodiment illustrated in FIG. 1, the users 102 communicate with the geo-spatial environment 100 through the network 104. The geo-spatial environment 100 includes the community network module 106, the map module 108, the geographic region module 110, the group module 112, the display module 114, the poll module 116 and the additional modules 118, communicating with each other. The map module 108 also processes (e.g., generates, tracks, captures, stores and/or analyzes, etc.) the map data 120.

In one embodiment, a geographic region 412 associated with a neighborhood may be determined and a first group of user profiles (e.g., the first group of user profiles 204A of FIG. 4) may be determined. For example, the specific geographic location 206 of each user profile 204 may be associated with the geographic region 412. A first display view (e.g., the display view 416 of FIG. 4) may be generated to include a three-dimensional map view (e.g., the three-dimensional map view 402 of FIG. 4) embodied by the community network 200 and the first group of user profiles 204A represented at locations in the three-dimensional map view 402 associated with the specific geographic location 206.

A second display view (e.g., the display view 416 of FIG. 4) may be generated to include a three-dimensional map view 402 embodied by the community network 200, a second group of user profiles 204B represented at locations in the three-dimensional map view 402 associated with the specific geographic location 206, and the poll results 516 (e.g., may include respondents' names, a response associated with each respondent, a response category, and/or a percentage associated with the response category, etc.). For example, each poll result 516 may be associated with a user profile 204.

In another embodiment, a geographic region 412 associated with a neighborhood may be determined and a third group of user profiles 204B may be determined (e.g., the specific geographic location 206 of each user profile 204 may be associated with the geographic region 412). A third display view (e.g., the display view 416 of FIG. 4) may be generated to include a three-dimensional map view 402 embodied by the community network 200 and the third group of user profiles 204B represented at locations in the three-dimensional map view 402 associated with the specific geographic location 206.

For example, the community network module 106 of the geo-spatial environment 100 may include the user profiles 204, each user profile 204 to include the specific geographic location 206. The geographic region module 110 of the geo-spatial environment 100 may determine the geographic region 412 (e.g., based on a street address associated with the user profile 204, a city, a county, a state and/or a country, etc.). The group module 112 of the geo-spatial environment 100 may determine the first group of user profiles 204A, the specific geographic location 206 of each user profile 204 associated with the geographic region 412. The map module 108 of the geo-spatial environment 100 may include the map data 120 which serves as a basis to render the three-dimensional map view 402 in the geo-spatial environment 100 to identify residences, businesses, and/or civic structures having specific geographic locations 206. The display module 114 of the geo-spatial environment 100 may generate the first display view 416 of the three-dimensional map view 402 embodied by the community network 200 and the first group of user profiles 204A, each user profile 204 (e.g., of the first group of user profiles 204A) represented at a location in the three-dimensional map view 402 corresponding to the associated specific geographic location 206.

The poll module 116 of the geo-spatial environment may generate a poll 404 associated with the first group of user profiles 204A and/or receive poll results 516 (e.g., may include respondents' names, a response associated with each respondent, a response category, and/or a percentage associated with the response category, etc.) associated with the poll 404 via a communication mode 410.

The poll 404 may be associated with a category selected from a group including an interest, a political subject (e.g., an election, a political party, a political issue, a platform, a candidate, and/or a vote, etc.) and/or a neighborhood issue, etc. The communication mode 410 may include an online mode (e.g., webpage, an email, an instant message, and/or telephone, etc.) and/or a physical mode (e.g., a physical mailing and/or newspaper, etc.).

Figure 2:
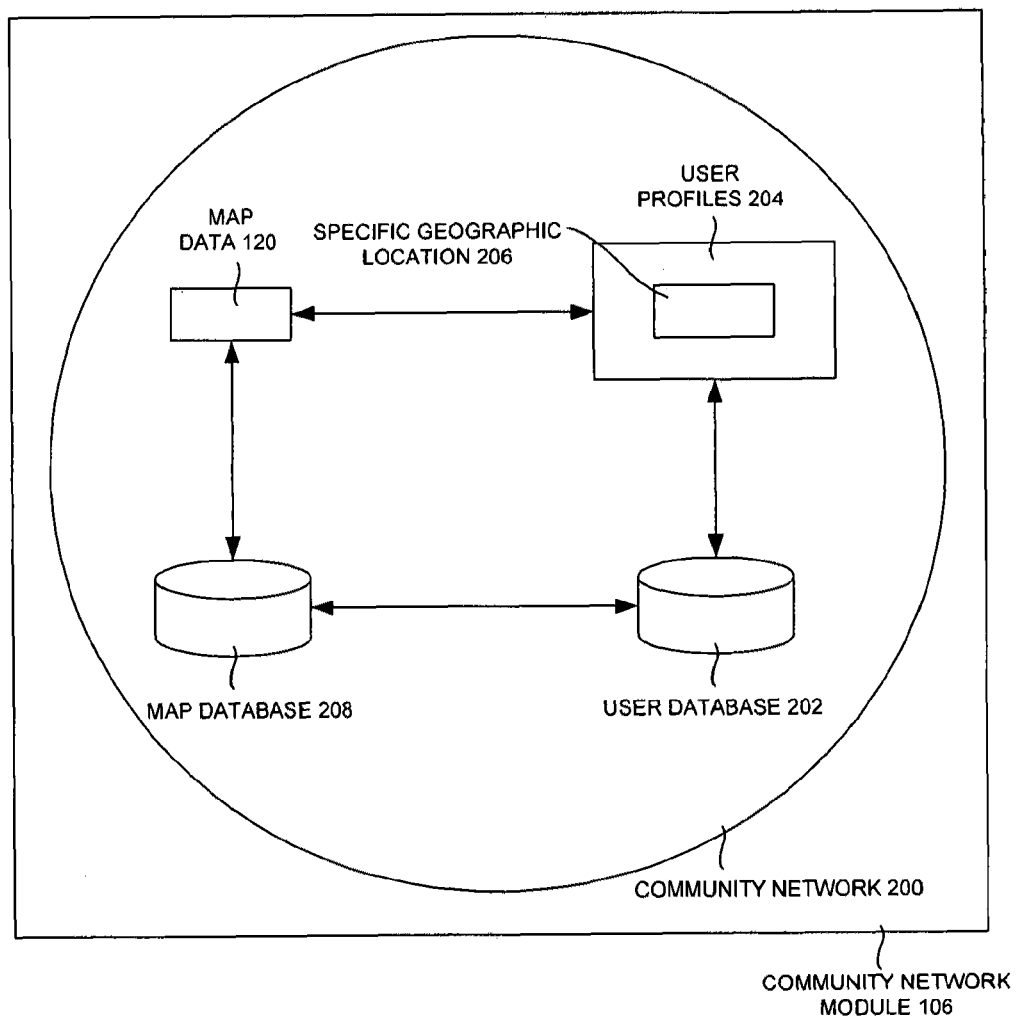
FIG. 2 is an exploded view of the community network module of FIG. 1, according to one embodiment.

FIG. 2 is an exploded view of the community network module 106 of FIG. 1, according to one embodiment. Particularly, FIG. 2 illustrates the map data 120, a community network 200, a user database 202, user profiles 204, a specific geographic location 206 and a map database 208, according to one embodiment.

The community network 200 may be a network of the user profiles 204 which enables conducting of a poll 404 in the geo-spatial environment 100. The user profiles 204 may include information such as a name, contact information (e.g., phone number, and/or email address, etc.), picture, and/or other personal information. The user database 202 may generate the user profiles 204 associated with the users 102 in the geo-spatial environment 100.

The user profiles 204 may be profiles having specific geographic locations 206 stored in the user database 202 in the geo-spatial environment 100. The specific geographic location 206 may be a geographic location associated with the user profiles 204 of the users 102. For example, the geographical location associated with the user profiles 204 may be identified based on latitudinal and longitudinal co-ordinates. The map database 208 may include the map data 120 (e.g., address data and/or location data, etc.) which serves as a basis to render the three-dimensional map view 402 in the geo-spatial environment 100.

In the example embodiment illustrated in FIG. 2, the community network module 106 includes the community network 200 that includes the user database 202 and the map database 208, from which the user profiles 204 and the map data 120 associated with the specific geographic location 206 are generated to enable polling in the geo-spatial environment 100.

In one embodiment, the community network 200 of the user profiles 204 (e.g., each user profile 204 associated with a specific geographic location 206) may be generated. A first instruction set of the geo-spatial environment 100 may enable the community network 200, to include the map database 208 associated with the map data 120 and the user database 202 associated with the user profiles 204 (e.g., each user profile 204 associated with a specific geographic location 206 identifiable in the map data 120). A second instruction set of the geo-spatial environment 100 integrated with the first instruction set may determine the geographic region 412 associated with a neighborhood, and a third instruction set of the geo-spatial environment 100 integrated with the first instruction set and the second instruction set may generate a group of user profiles 204. In one example embodiment, the specific geographic location 206 of each user profile 204 is associated with the geographic region 412.

Figure 3:
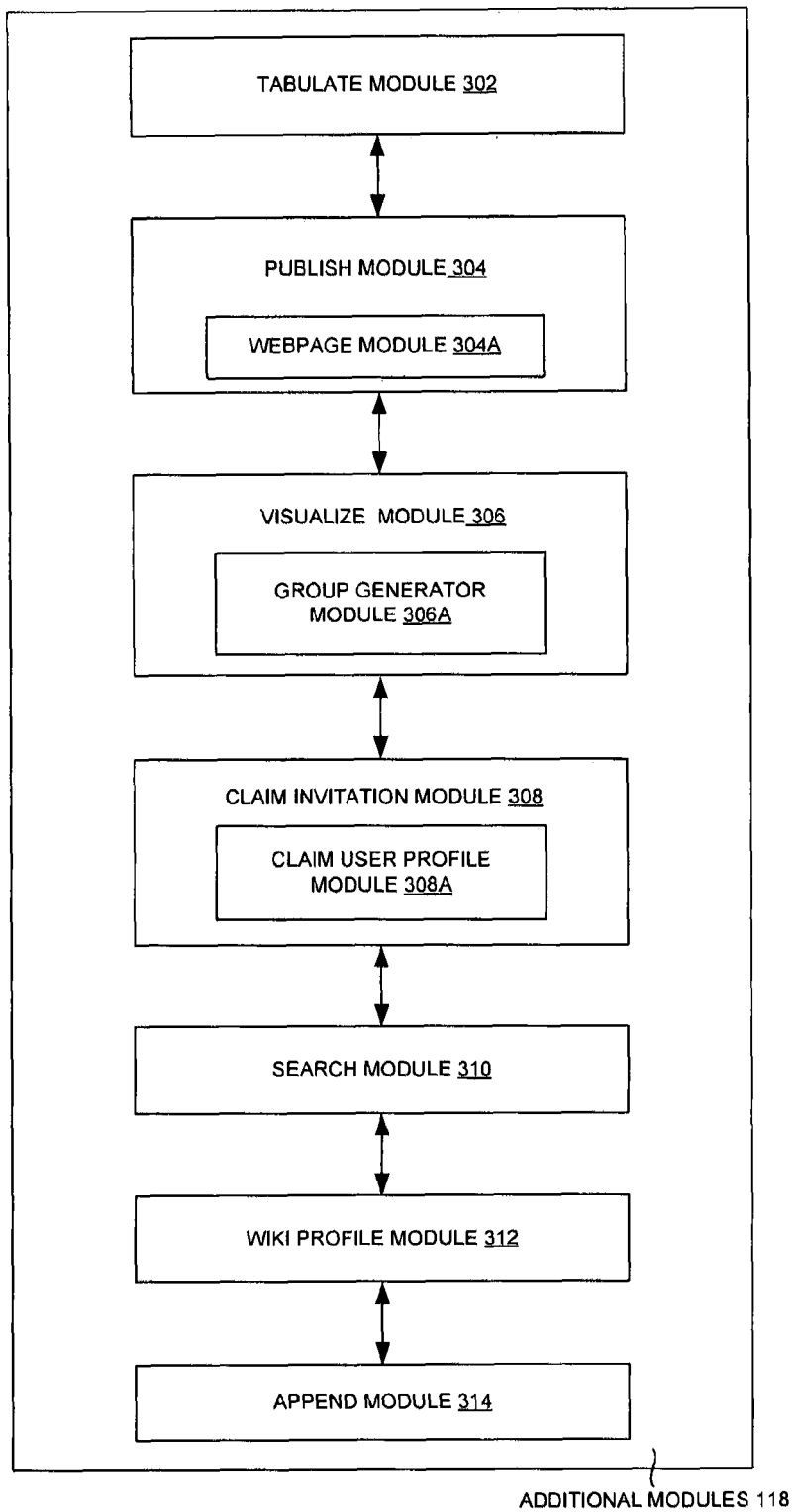
FIG. 3 is an exploded view of the additional modules of FIG. 1, according to one embodiment.

FIG. 3 is an exploded view of the additional modules 118 of FIG. 1, according to one embodiment. Particularly, FIG. 3 illustrates a tabulate module 302, a publish module 304, a webpage module 304A, a visualize module 306, a group generator module 306A, a claim invitation module 308, a claim user profile module 308A, a search module 310, a wiki profile module 312 and an append module 314, according to one embodiment.

The tabulate module 302 may automatically tabulate (e.g., record, track and/or analyze, etc.) poll results 516 associated with a poll 404 in the geo-spatial environment 100. The publish module 304 may publish the poll results 516 via a communication mode (e.g., communication mode 410 of FIG. 4) in the geo-spatial environment 100. For example, the communication mode 410 may include webpage, email, instant message, newspaper, and/or physical mailing, etc. The webpage module 304A may generate a webpage associated with the poll results 516. For example, the webpage may include a three-dimensional map view 402 with user profiles 204 associated with the poll results 516 represented at associated specific geographic locations 206.

Figure 6:
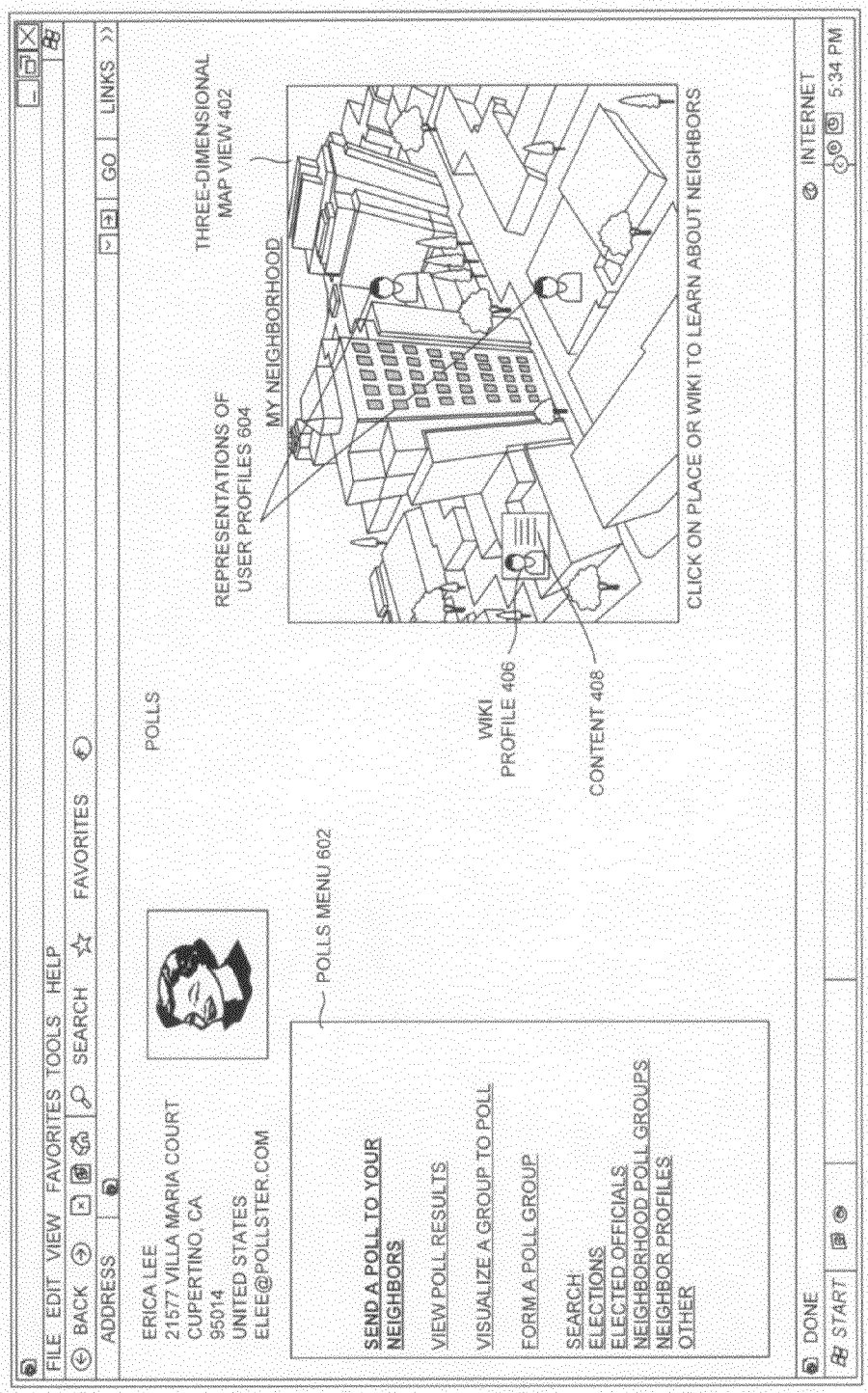
FIG. 6 is a user interface view displaying a polls menu associated with the poll, according to one embodiment.

The visualize module 306 may enable visualization of a poll group (e.g., through visualize a group to poll option of polls menu 602 of FIG. 6) associated with a geographic region 412 in the geo-spatial environment 100. The group generator module 306A may generate poll group invitations (e.g., the poll group invitation 1302 of FIG. 13) associated with the user profiles 204. For example, the poll group invitations 1302 may be communicated to the users 102 of the geo-spatial environment 100 for joining a poll group. The group generator module 306A may also receive responses associated with the poll group invitations 1302 from the users 102.

The claim invitation module 308 may generate a claim invitation (e.g., along with the poll 404) for the users 102 to claim their unclaimed user profiles 204 in the geo-spatial environment 100. The claim user profile module 308A may authenticate an email address associated with the unclaimed user profile 204. For example, if the email address is authenticated, claiming of the unclaimed user profile 204 may be enabled. The search module 310 may provide search categories (e.g., may include elections, candidates, debates, elected officials, neighborhood groups, and/or neighbor profiles, etc.) to enable searching of user profiles 204 in the geo-spatial environment 100. The wiki profile module 312 may generate (e.g., in the display view 416) wiki profiles (e.g., the wiki profiles 406 illustrated in FIG. 4) associated with the user profiles 204 in the geo-spatial environment 100. The append module 314 may generate (e.g., with the wiki profiles 406) content (e.g., comments, feedback, ratings, and/or flags, etc.) added, modified and/or updated by the users 102 of the geo-spatial environment 100 in the wiki profiles 406.

In the example embodiment illustrated in FIG. 3, the additional modules 118 include the tabulate module 302, the publish module 304, the webpage module 304A, the visualize module 306, the group generator module 306A, the claim invitation module 308, the claim user profile module 308A, the search module 310, the wiki profile module 312 and the append module 314, communicating with each other.

In one embodiment, the poll results 516 may be automatically tabulated (e.g., using the tabulate module 302 of FIG. 3) and published via a communication mode 410. For example, the poll results 516 including respondents' names, a response associated with each respondent, a response category, and/or a percentage associated with the response category may be published. In addition, the poll group associated with a portion of a third group of user profiles (e.g., the other groups of user profiles 204B of FIG. 4) may be formed. In one embodiment, a sixth instruction set of the geo-spatial environment 100 may visualize the poll group (e.g., through the three-dimensional map view 402 of FIG. 12) and form the poll group.

FIG. 4 is a block diagram illustrating generation of a display view 416 associated with a poll 404, according to one embodiment. Particularly, FIG. 4 illustrates the geographic region module 110, the group module 112, the display module 114, the poll module 116, the map data 120, the user database 202, the user profiles 204, a first group of user profiles 204A, other groups of user profiles 204B, the map database 208, the tabulate module 302, the publish module 304, the webpage module 304A, the visualize module 306, the group generator module 306A, the claim invitation module 308, the claim user profile module 308A, the search module 310, the wiki profile module 312, the append module 314, a three-dimensional map view 402, the poll 404, wiki profiles 406, content 408, a communication mode 410, a geographic region 412, search categories 414 and the display view 416, according to one embodiment.

The three-dimensional map view 402 may enable users 102 of the geo-spatial environment 100 to visualize user profiles 204 associated with the poll 404. The poll 404 may be a survey of people's opinion. For example, the poll 404 may represent opinions of users 102 by asking a series of questions related to categories like interests, neighborhood issues, and/or political subjects, etc. The wiki profiles 406 may be profiles (e.g., claimed, and/or unclaimed, etc.) displaying information (e.g., name, address, and/or location, etc.) associated with the users 102. The content 408 may be comments, remarks and/or feedbacks (e.g., positive, negative, and/or neutral, etc.) appended by the users 102 of the geo-spatial environment 100. For example, the content 408 may be generated in the wiki profiles 406 displayed in the three-dimensional map view 402.

The communication mode 410 may enable sending of polls 404 and/or receiving of poll responses associated with the user profiles 204. In addition, the communication mode 410 may enable communication of poll group invitations 1302, claim invitations 804 and receiving of poll group responses associated with the poll group invitations 1302. For example, the communication mode 410 may include a webpage, an email, an instant message, newspaper, a physical mailing, and/or a telephone, etc. The geographic region 412 may be an area associated with the specific geographic location of the user profiles 204 (e.g., associated with the poll 404). In one example embodiment, the geographic region 412 may be determined based on longitudinal and latitudinal co-ordinates. The search categories 414 may enable the users 102 to search user profiles 204 associated with the poll 404 in the geo-spatial environment 100. For example, the search categories 414 may include elections, candidates, debates, elected officials, neighborhood groups, and/or neighbor profiles, etc. The display view 416 may display the groups of user profiles 204 associated with the poll 404 in the three-dimensional map view 402.

In the example embodiment illustrated in FIG. 4, the display view 416 includes the three-dimensional map view 402, the user profiles 204 generated through the user database 202, the wiki profiles 406 generated through the wiki profile module 312 and the content 408 generated using the append module 314. The display view 416 also represents the poll 404 associated with the first group of user profiles 204A and the other groups of user profiles 204B. The poll module 116 may generate a poll 404 (e.g., displayed in the display view 416 of FIG. 4) via the communication mode 410 (e.g., online mode and/or physical mode, etc.).

The results of the poll 404 may be published (e.g., through the publish module 304) and viewed in the display view 416 after tabulation by the tabulate module 302. The search module 310 may generate the search categories 414 based on which the users 102 search desired user profiles 204 in the geo-spatial environment 100. The display view 416 also displays poll group invitations 1302 (e.g., generated through the group generator module 306A of FIG. 3) and claim invitations 804 (e.g., generated through the claim invitation module 308 of FIG. 3) to be communicated to the users 102 of the geo-spatial environment 100. The display module 114 may obtain map data 120 (e.g., generated using the map database 208) associated with the geographic region 412 to display the user profiles 204 in the display view 416.

In one embodiment, the poll 404 associated with the first group of user profiles 204A may be generated via a communication mode 410. The poll 404 may be associated with a category selected from a group including an interest, a political subject (e.g., an election, a political party, a political issue, a platform, a candidate, and/or a vote, etc.), and/or a neighborhood issue, etc. The communication mode 410 may include an online mode (e.g., a webpage, an email, an instant message and/or a telephone, etc.) and/or a physical mode (e.g., a physical mailing and/or newspaper, etc.). The poll results 516 (e.g., respondents' names, a response associated with each respondent, a response category, and/or a percentage associated with the response category, etc.) associated with the poll 404 may be received via the communication mode 410.

In another embodiment, search categories 414 (e.g., elections, candidates, debates, elected officials, neighborhood groups, and/or neighbor profiles, etc.) may be provided and a search category 414 may be selected. A search of the user profiles 204 based on the search category 414 may be generated. The user profiles 204 matching the search category 414 may be displayed in the three-dimensional map view 402, represented at locations in the three-dimensional map view 402 associated with the specific geographic location 206 (e.g., of each user profile 204 matching the search category 414).

In some embodiments, a fourth instruction set of the geo-spatial environment 100 integrated with the first instruction set, the second instruction set and the third instruction set may display a three-dimensional map view 402 embodied by the community network 200 and the group of user profiles 204 represented at locations in the three-dimensional map view 402 corresponding to the associated specific geographic location 206. A fifth instruction set of the geo-spatial environment 100 integrated with the first instruction set, the second instruction set, the third instruction set and the fourth instruction set may generate a poll 404, via a communication mode 410, associated with a group of user profiles 204 and a seventh instruction set of the geo-spatial environment 100 may generate a search of the user profiles 204 based on a search category 414.

Figure 5:
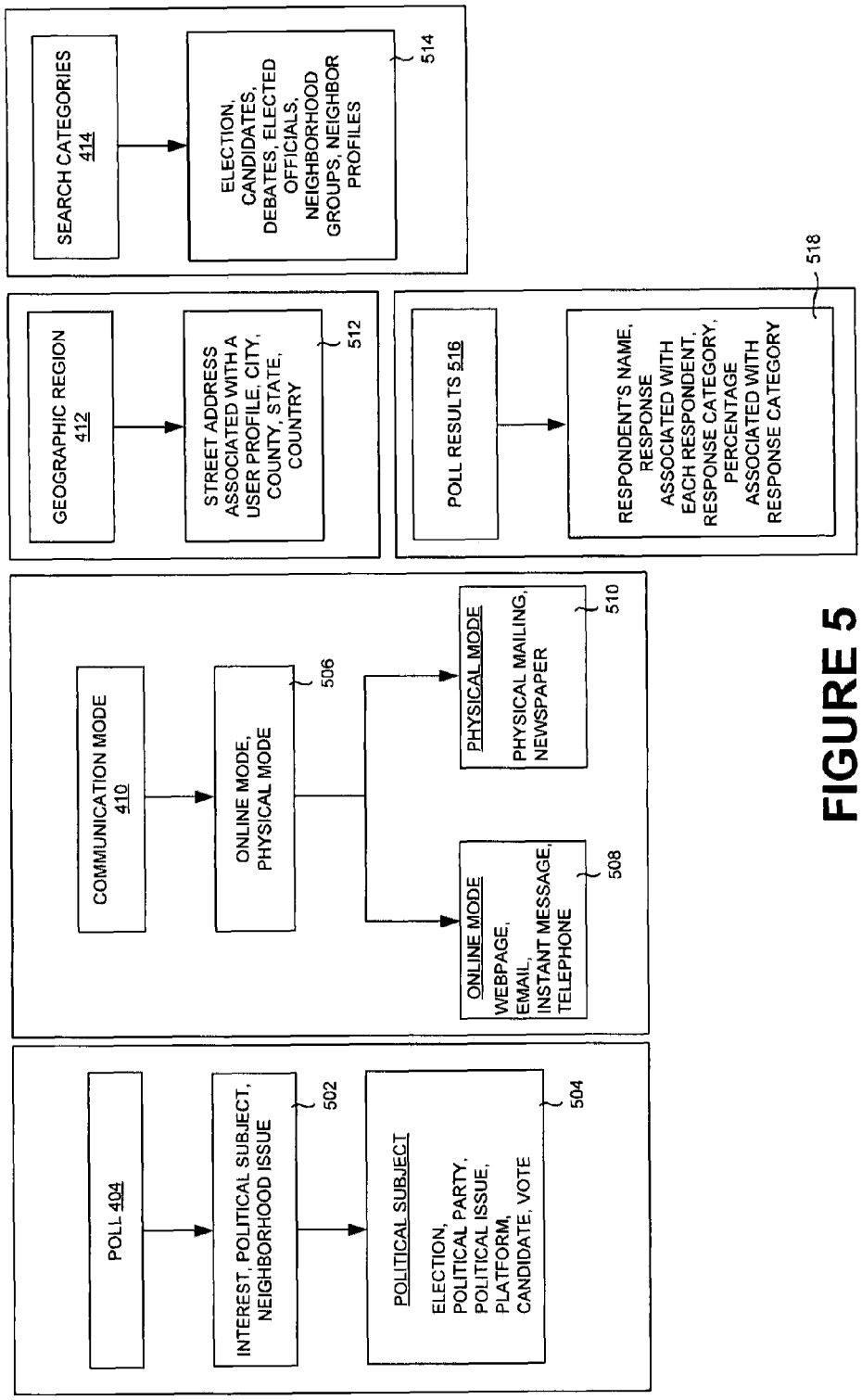
FIG. 5 is a block diagram representation of the poll and related activities, according to one embodiment.

FIG. 5 is a block diagram representation of the poll 404 and related activities, according to one embodiment. Particularly, FIG. 5 illustrates the poll 404, the communication mode 410, the geographic region 412, the search categories 414, a block 502, political subject 504, a block 506, an online mode 508, a physical mode 510, a block 512, a block 514, poll results 516, and a block 518, according to one embodiment.

The block 502 may represent a group from which a category associated with the poll 404 is selected. For example, the poll 404 may be conducted in the geo-spatial environment 100 based on the category selected from the group. The political subject 504 may be a category associated with the poll 404 selected by the user 102. The block 506 may represent types of communication modes 410 used for generating the poll 404 associated with a group of user profiles (e.g., the first group of user profiles 204A of FIG. 4) in the geo-spatial environment 100. For example, the communication mode 410 may be an online mode 508 and/or a physical mode 510.

The online mode 508 and the physical mode 510 may be types of communication modes 410 through which the poll 404 associated with the first group of user profiles 204A may be generated. In one example embodiment, the poll results 516 associated with the poll 404 may be received via the online mode 508 and/or the physical mode 510. The block 512 may represent a specific geographic location 206 associated with the geographic region 412.

The block 514 may represent search categories based on which the users 102 search for the user profiles 204 in the geo-spatial environment 100. The poll results 516 may be responses obtained from the users 102 associated with the poll 404. For example, the poll results 516 may include name of a winner, percentage of votes obtained, total number of people voted, number of invalid votes, name of a constituency, names of other candidates, and/or votes obtained by other candidates, etc. The block 518 may represent details associated with the poll results 516. For example, the responses from respondents of the poll 404 may be accumulated prior to tabulating the poll results 516.

In the example embodiment illustrated in FIG. 5, the block 502 displays the categories associated with the poll 404 such as interest, political subject, neighborhood issue from which a category may be selected to conduct a poll 404 in the geo-spatial environment 100. The category political subject 504 displays election, political party, political issue, platform, candidate and vote. The polls 404 and the poll results 516 may be communicated with the users 102 of the geo-spatial environment 100 through various communication modes 410. The communication mode 410 displays an online mode and/or a physical mode as illustrated in block 506. The online mode 508 displays webpage, email, instant message and telephone and the physical mode 510 displays physical mailing and newspaper. The poll 404 may be conducted by the user profiles 204 associated with a geographic region 412.

The geographic region 412 associated with the user profiles 204 includes street address, county, state, country, etc. as illustrated in block 512. The block 514 displays the search categories 414 such as election, candidates, debates, elected officials, neighborhood groups and neighbor profiles based on which the user profiles 204 may be searched in the geo-spatial environment 100. The poll results 516 associated with the poll 404 includes respondent's name, response of the respondent, response category, percentage associated with the response category, etc. as illustrated in the block 518.

FIG. 6 is a user interface view 600 displaying a polls menu 602 associated with the poll 404, according to one embodiment. Particularly, FIG. 6 illustrates the three-dimensional map view 402, the wiki profile 406, the content 408, the polls menu 602 and representations of user profiles 604, according to one embodiment.

The polls menu 602 may display activities associated with the poll 404 in the geo-spatial environment 100. The representations of user profiles 604 may be user profiles 204 (e.g., claimed and/or unclaimed, etc.) displayed on the three-dimensional map view 402.

In the example embodiment illustrated in FIG. 6, the user interface view 600 displays details of a user 102 (e.g., Erica Lee). Erica Lee may be a moderator of a poll group who conducts polling in the community network 200. For example, Erica Lee may send a poll 404 to neighbors and receive responses from them. In addition, Erica Lee may monitor voting procedure and/or assist other users 102 (e.g., voters) who participate in the poll 404.

The polls menu 602 may enable the users 102 of the geo-spatial environment 100 to view poll results 516, visualize poll groups, form poll groups, and/or search for user profiles 204 associated with the poll 404, etc. The user profiles 204 and the wiki profiles 406 associated with the poll 404 are represented in the three-dimensional map view 402 displayed in the user interface view 600.

Figure 7:
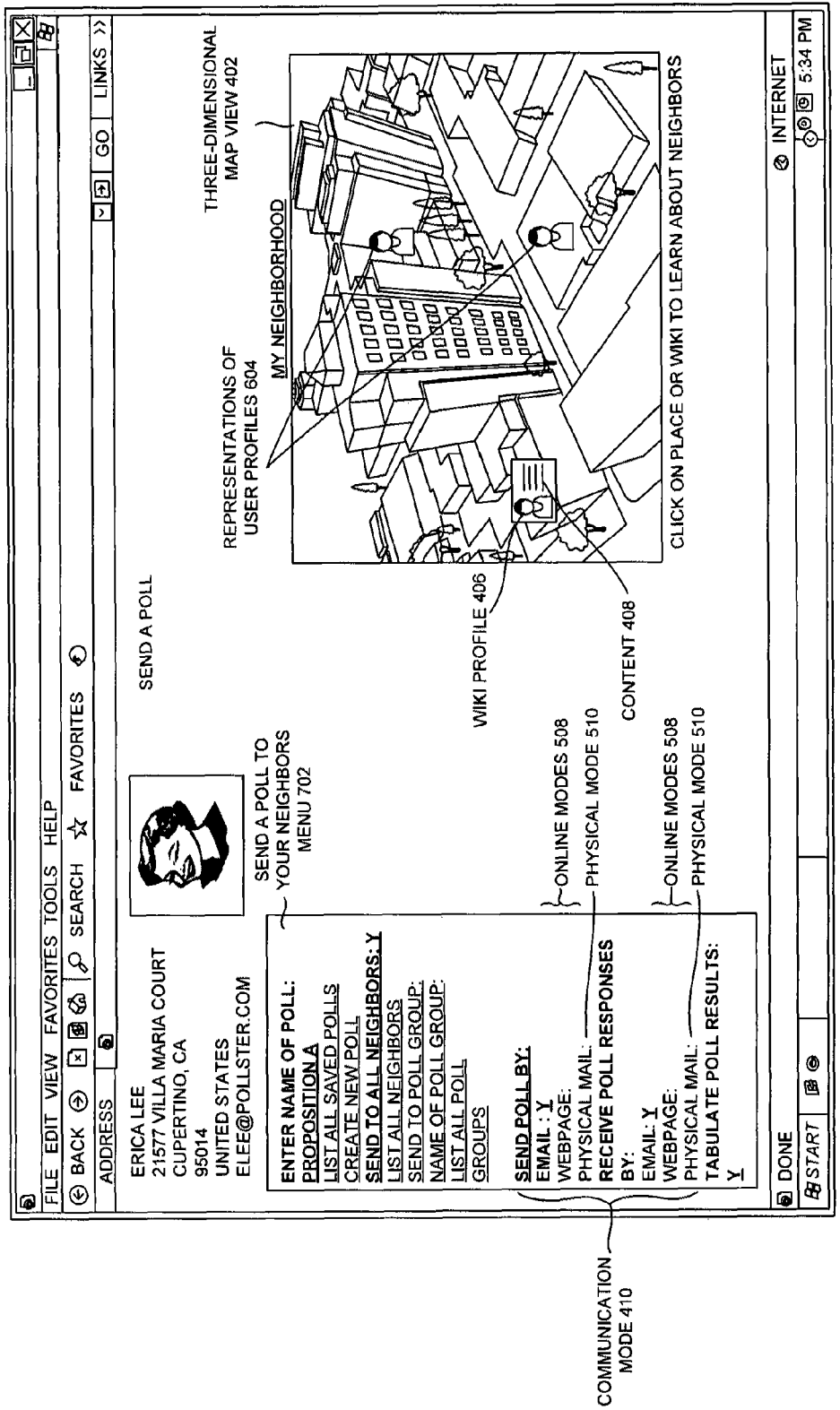
FIG. 7 is a user interface view displaying communication of polls in the geo-spatial environment via communication modes, according to one embodiment.

FIG. 7 is a user interface view 700 displaying communication of a poll 404 in the geo-spatial environment 100 via communication mode 410, according to one embodiment. Particularly, FIG. 7 illustrates the three-dimensional map view 402, the wiki profile 406, the content 408, the communication mode 410, the online modes 508, the physical mode 510, the representations of user profiles 604 and a send a poll to your neighbors menu 702, according to one embodiment.

The send a poll to your neighbors menu 702 displays various options that may enable sending of a poll 404 and/or receiving responses to the poll 404 via the communication mode 410 in the geo-spatial environment 100. For example, the communication mode 410 may include an online mode 508 (e.g., a webpage, an email, telephone, and/or an instant message, etc.) and/or a physical mode 510 (e.g., physical mailing, and/or newspapers, etc.).

In the example embodiment illustrated in FIG. 7, the send a poll to your neighbors menu 702 displayed in the user interface view 700 illustrates various communication modes 410 through which the poll 404 is sent and responses are received. The poll 404 (e.g., Proposition A) are sent to all neighbors associated with Erica Lee (e.g., the moderator associated with Proposition A poll 404). Erica Lee may prefer to send a poll 404 and receive responses from the neighbors through emails as illustrated in the send a poll to your neighbors menu 702. The send a poll to your neighbors menu 702 also displays that the poll results 516 are to be tabulated upon accumulation of the responses received from the neighbors. The three-dimensional map view 402 represents the user profiles 204 and the wiki profiles 406 that provide details of the neighbors to whom the poll 404 is to be communicated.

Figure 8:
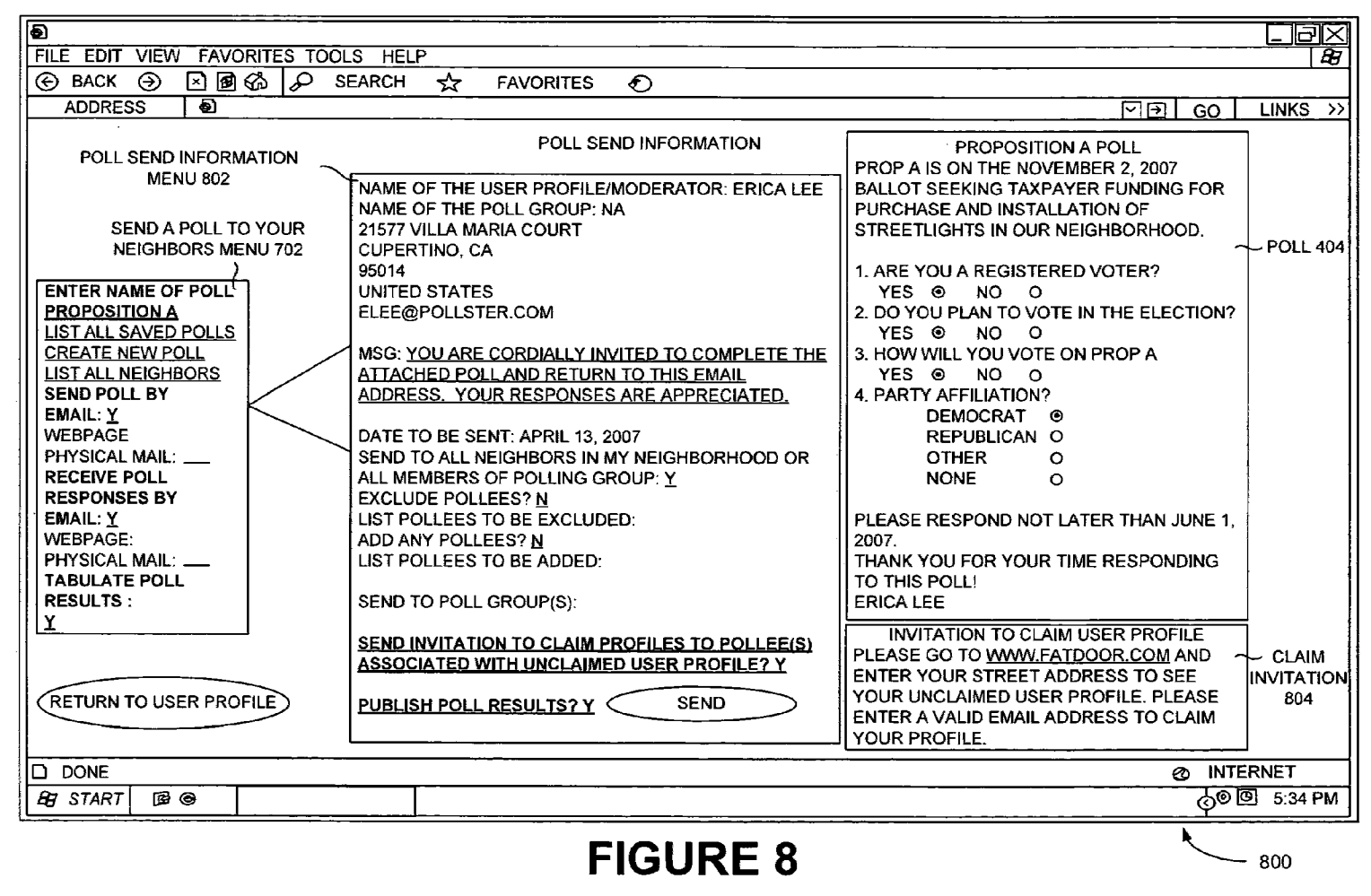

FIG. 8 is a user interface view 800 displaying poll information communicated to the users 102 of the geo-spatial environment 100, according to one embodiment. Particularly, FIG. 8 illustrates the poll 404, the send a poll to your neighbors menu 702, a poll send information menu 802 and a claim invitation 804, according to one embodiment.

The poll send information menu 802 may display information associated with the poll 404 sent to neighbors. The claim invitation 804 may be an invitation sent along with the poll 404 to the users 102 of the geo-spatial environment 100 to claim their profiles 204.

In the example embodiment illustrated in FIG. 8, the user interface view 800 displays the poll send information menu 802. The details in the poll send information menu 802 includes profile details of a moderator (e.g., Erica Lee), a message associated with the poll group invitation 1302, date of sending the poll 404, options to send the claim invitation 804 to the users 102 along with the poll group invitation 1302, tabulate poll results 516, etc. The poll 404 may enable the users 102 to express their opinions by responding to questions provided in the poll 404. If the user 102 who received the poll 404 has not claimed profile 204, the user 102 may claim the user profile 204 by entering a valid email address. The claim invitation 804 associated with claiming an unclaimed user profile 204 of the first group of user profiles 204A may be generated together with the poll 404.

Figure 9:
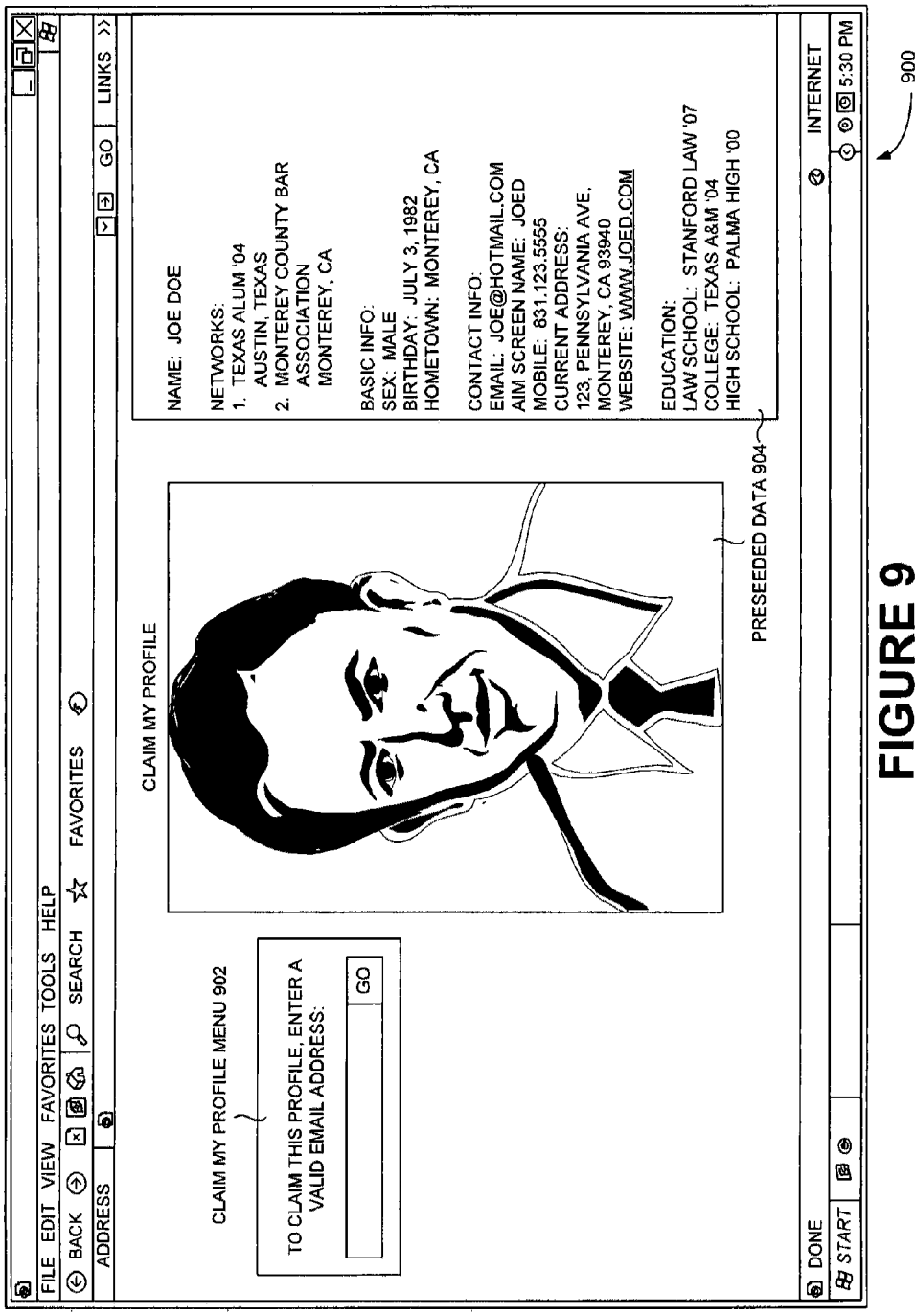
FIG. 9 is a user interface view of claiming user profiles in the geo-spatial environment, according to one embodiment.

FIG. 9 is a user interface view 900 of claiming user profiles 204 in the geo-spatial environment 100, according to one embodiment. Particularly, FIG. 9 illustrates a claim my profile menu 902 and preseeded data 904, according to one embodiment.

The claim my profile menu 902 may enable the users 102 of the geo-spatial environment 100 to claim their profiles 204. For example, the user profiles 204 may include information such as a name, address, contact information (e.g., phone number, email address, etc.), picture, and/or other personal information. The preseeded data 904 may be information (e.g., may include images) verified against data provided by the users 102 of unclaimed profile while enabling a claim of an unclaimed user profile 204. For example, the preseeded data 904 may include details of the unclaimed user profile 204 in the geo-spatial environment 100.

In the example embodiment illustrated in FIG. 9, the user interface view 900 displays the preseeded data 904 along with the claim my profile menu 902. If the details (e.g., name, networks, basic info, contact info, and/or education, etc.) in the preseeded data 904 are associated with any user 102, the user 102 may claim the user profile 204. The user 102 may enter an e-mail address in the claim my profile menu 902 which is authenticated to enable claiming of the user profile 204. For example, the email address associated with an unclaimed user profile 204 of a first group of user profiles 204A may be authenticated and a claim of the unclaimed user profile 204 of the first group of user profiles 204A may be enabled (e.g., using the claim user profile module 308A of FIG. 3).

Figure 10:
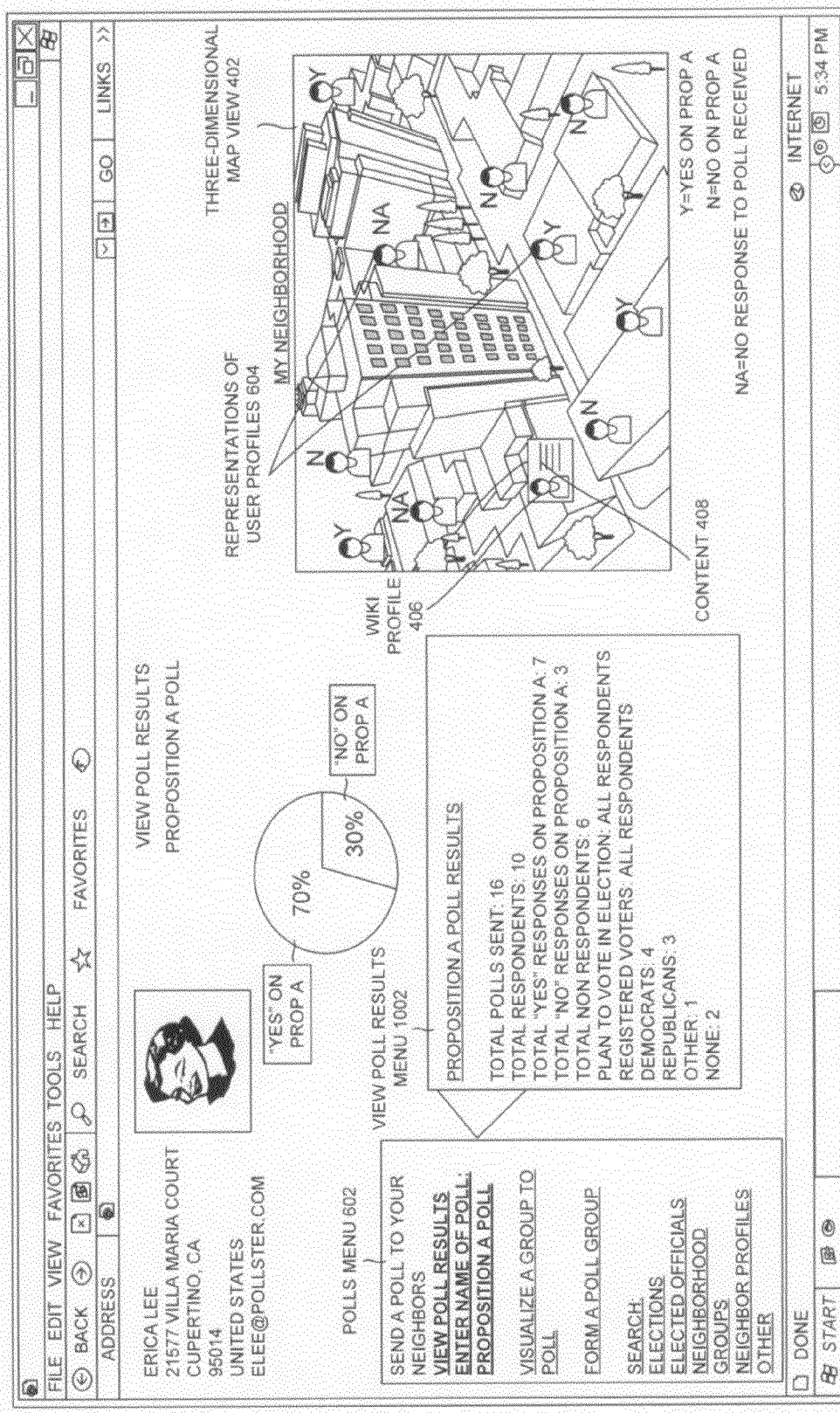
FIG. 10 is a user interface view displaying poll results associated with the poll in the geo-spatial environment, according to one embodiment.

FIG. 10 is a user interface view 1000 displaying poll results 516 associated with the poll 404 in the geo-spatial environment 100, according to one embodiment. Particularly, FIG. 10 illustrates the three-dimensional map view 402, the wiki profile 406, the content 408, the representations of user profiles 604, the polls menu 602 and a view poll results menu 1002, according to one embodiment.

The view poll results menu 1002 may enable the users 102 of the geo-spatial environment 100 to view the poll results 516 and respondents associated with the poll 404. In the example embodiment illustrated in FIG. 10, the user interface view 1000 displays percentage of 'YES' and 'NO' responses associated with 'Proposition A' poll results in a pie chart (e.g., '70%' with 'YES' responses and '30%' with 'NO' responses to Proposition A poll). The view poll results menu 1002 displays number of total polls sent (e.g., 16), total respondents (e.g., 10), total 'YES' responses (e.g., 7), total 'NO' responses (e.g., 3), total non respondents (e.g., 6) related to proposition A poll results.

The view poll results menu 1002 also displays votes obtained by Democrats, Republicans, Others and None as 4, 3, 1 and 2 respectively. The three-dimensional map view 402 displays representations of user profiles 604 (e.g., of the respondents) associated with the poll results 516 of proposition A. The users 102 of the geo-spatial environment 100 may view user profiles 204 of the respondents along with the wiki profile 406 and the content 408 associated with the wiki profiles in the three-dimensional map view 402.

Figure 11:
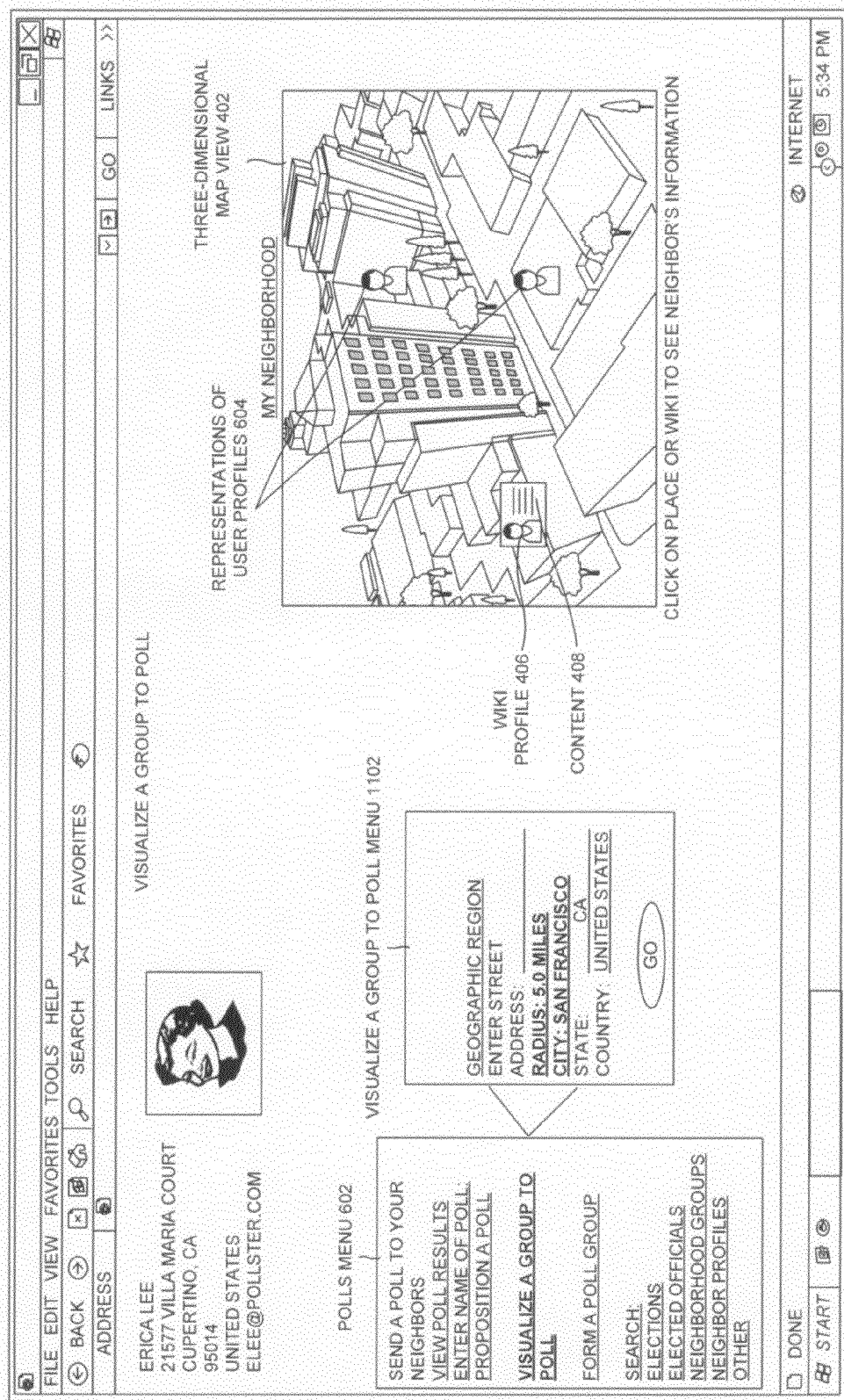
FIG. 11 is a user interface view displaying poll groups associated with a geographic region, according to one embodiment.

FIG. 11 is a user interface view 1100 displaying poll groups associated with a geographic region (e.g., the geographic region 412 of FIG. 4), according to one embodiment. Particularly, FIG. 11 illustrates the three-dimensional map view 402, the wiki profile 406, the content 408, the representations of user profiles 604, the polls menu 602 and a visualize a group to poll menu 1102, according to one embodiment.

The visualize a group to poll menu 1102 may enable users 102 of the geo-spatial environment 100 to visualize different poll groups associated with the geographic region 412 on a three-dimensional map view 402. For example, the poll groups may be formed by the users 102 associated with the geographic region 412.

In the example embodiment illustrated in FIG. 11, the visualize a group to poll menu 1102 enable the users 102 to visualize poll groups associated with the geographic region 412. The users 102 may enter a radius (e.g., 5.0 miles) in the visualize a group to poll menu 1102 to view the poll groups in the specified geographic area. A moderator of the poll group may send an invitation to the users 102 to join the poll group. For example, the specific geographic location 206 associated with different poll groups are represented in the three-dimensional map view 402 along with the wiki profile 406 and the content 408.

Figure 12:
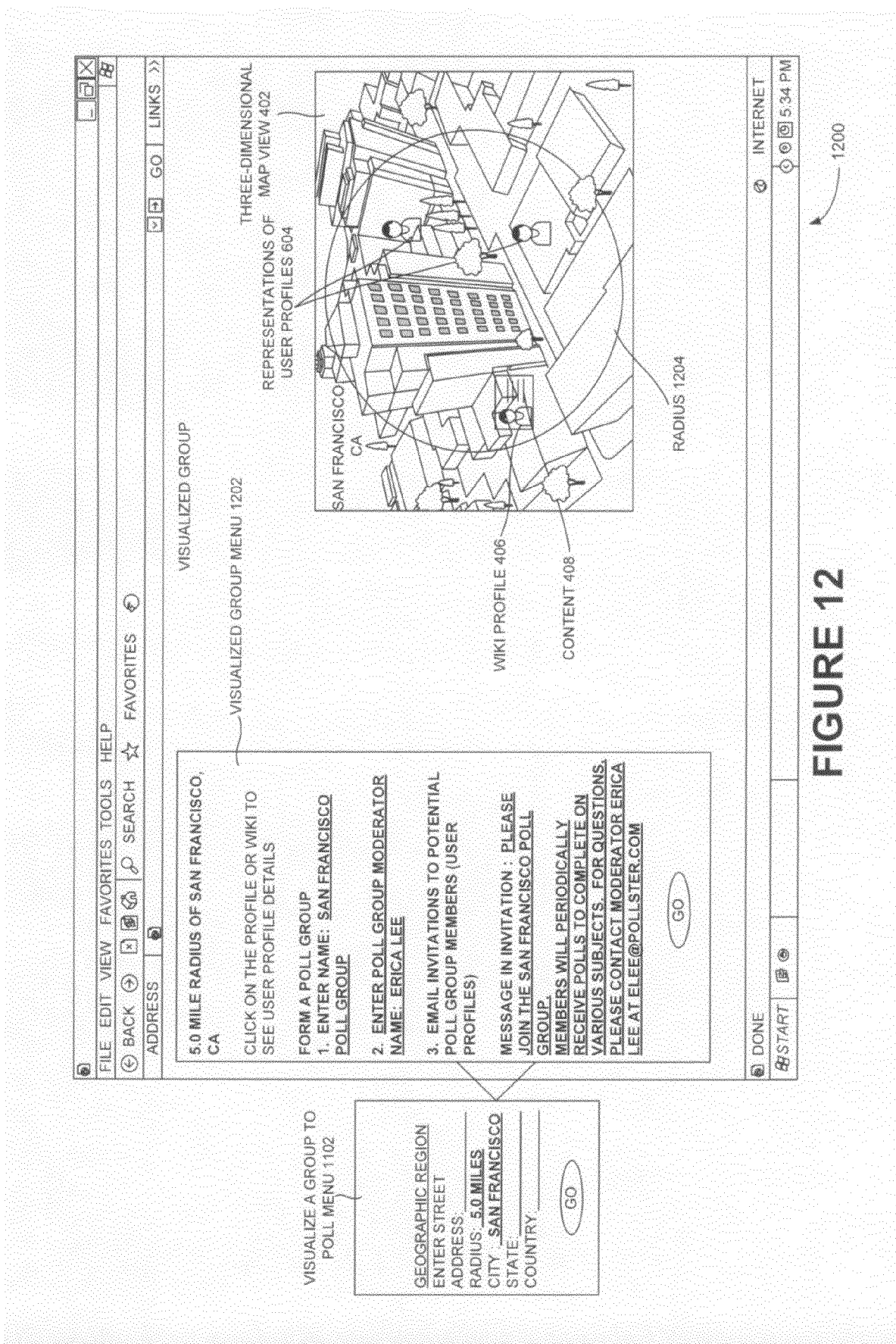
FIG. 12 is a user interface view of searching a poll group in the geo-spatial environment based on a radius, according to one embodiment.

FIG. 12 is a user interface view of searching a poll group in the geo-spatial environment 100 based on a radius 1204, according to one embodiment. Particularly, FIG. 12 illustrates the three-dimensional map view 402, the wiki profile 406, the content 408, the representations of user profiles 604, the visualize a group to poll menu 1102, a visualized group menu 1202 and the radius 1204, according to one embodiment.

The visualized group menu 1202 may enable users 102 to visualize a poll group and its related activities. The radius 1204 may be an area encompassing a geographical location of the poll group specified by the users 102 to visualize poll groups. For example, the user 102 may view the poll groups on a three-dimensional map view 402 within the radius 1204 specified by the user 102.

In the example embodiment illustrated in FIG. 12, the user interface view 1200 displays the radius 1204 specified by the user 102 on the three-dimensional map view 402. The radius 1204 encompasses 'San Francisco poll group' showing associated user profiles 204 on the three-dimensional map view 402. The visualized group menu 1202 displayed in the user interface view 1200 displays an invitation to join San Francisco poll group. In one example embodiment, the users 102 (e.g., members) who have joined San Francisco poll group may periodically receive polls 404 to complete on various subjects sent by a moderator of the poll group (e.g., Erica Lee). The users 102 of the geo-spatial environment 100 may also visualize profile details of the members of San Francisco poll group by clicking on the wiki profile 406 represented on the three-dimensional map view 402.

FIG. 13 is a user interface view 1300 displaying a poll group invitation 1302, according to one embodiment. Particularly, FIG. 13 illustrates a poll group invitation 1302, according to one embodiment.

The poll group invitation 1302 may be an invitation sent to the users 102 of the geo-spatial environment to join a poll group. In the example embodiment, the poll group invitation 1302 displays profile details (e.g., name, address, e-mail address, etc.) of the moderator (e.g., Erica Lee) of the poll group. The poll group invitation 1302 also displays a message to the user 102. The message displays that any user 102 may become a member of the poll group free of cost and may withdraw the membership any time from the poll group.

The message also conveys that members receive and/or respond to the poll 404, create and send their own polls 404 via the moderator (e.g., Erica Lee), etc. The poll group invitation 1302 further displays that results 516 of the poll 404 are automatically tabulated and sent to the members via communication modes 410 such as e-mail, instant messenger, physical mail, and/or newspapers, etc. In one example embodiment, the community network 200 may have access to related webpages such as election updates and results, political candidate pages, etc. For example, poll group invitations 1302 may be generated. Poll group responses associated with the poll group invitations 1302 may be received (e.g., from the users 102).

Figure 14:
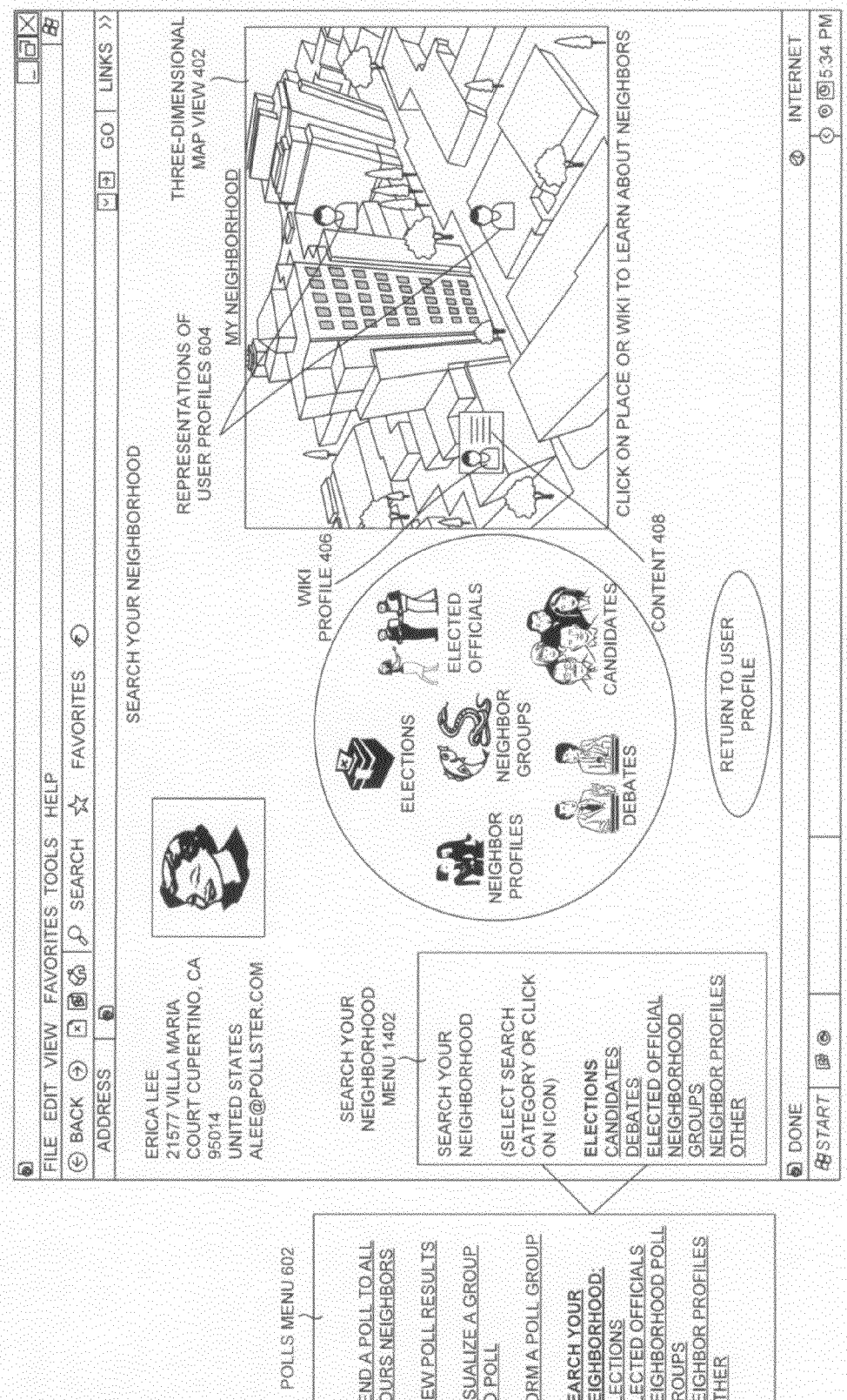
FIG. 14 is a user interface view of searching user profiles in the geo-spatial environment based on search categories, according to one embodiment.

FIG. 14 is a user interface view 1400 of searching user profiles 204 in the geo-spatial environment 100 based on search categories, according to one embodiment. Particularly, FIG. 14 illustrates the three-dimensional map view 402, the wiki profile 406, the content 408, the polls menu 602, the representations of user profiles 604 and a search your neighborhood menu 1402, according to one embodiment.

The search your neighborhood menu 1402 may enable users 102 of the geo-spatial environment 100 to search user profiles 204 associated with the poll 404 in their neighborhood. For example, the users 102 may search the user profiles 204 of candidates, elected officials, etc. associated with the poll 404.

In the example embodiment illustrated in FIG. 14, the user interface view 1400 displays various search categories 414 based on which the user 102 (e.g., Erica Lee) search the user profiles 204 in the geo-spatial environment 100. The search categories 414 include elections, debates, candidates, elected officials, neighborhood groups, neighbor profiles, etc. The user 102 may search for neighborhood profiles based on the search category 414. The user profiles 204 matching the search category 414 provided by the user 102 may be displayed on the three-dimensional map view 402.

Figure 15:
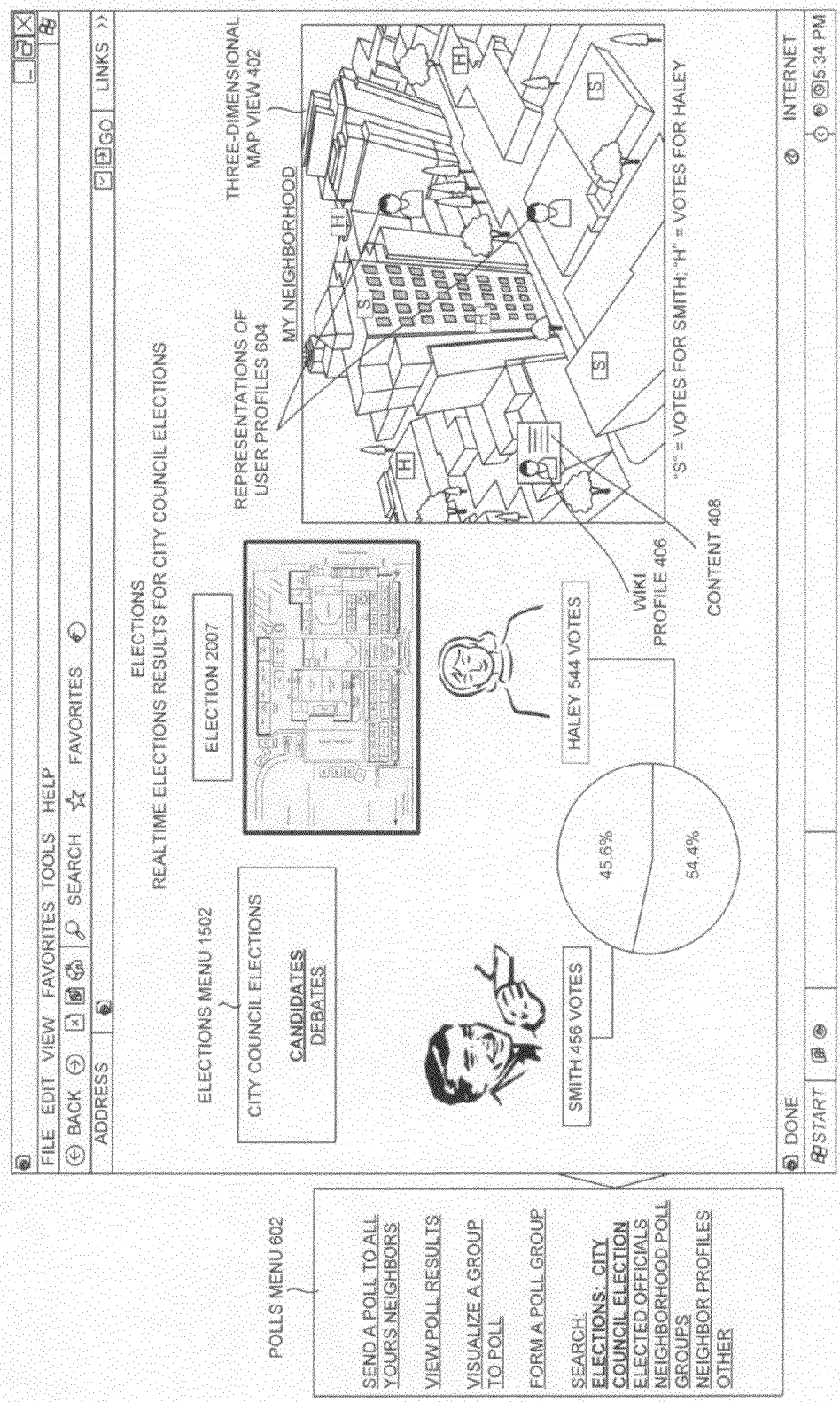
FIG. 15 is a user interface view displaying realtime election results for a City Council election, according to one embodiment.

FIG. 15 is a user interface view 1500 displaying realtime election results for a City Council election, according to one embodiment. Particularly, FIG. 15 illustrates the three-dimensional map view 402, the wiki profile 406, the content 408, the polls menu 602, the representations of user profiles 604 and an elections menu 1502, according to one embodiment.

The elections menu 1502 may include various options such as candidates option and debates option associated with the poll 404 in the geo-spatial environment 100. For example, the candidates option in the elections menu 1502 may display details of candidates running in the City Council election and the debates option may display political debates among the candidates.

In the example embodiment illustrated in FIG. 15, the user interface view 1500 displays poll results 516 associated with a Cupertino City Council election. The user interface view 1500 also displays percentage of votes received by the candidates in a pie chart. The user interface view displays candidate 'Smith', votes obtained '456' and candidate 'Haley', votes obtained '544'. The users 102 of the geo-spatial environment 100 may search for users profiles 204 associated with the election results (e.g., Cupertino City Council) based on the search category 414. The election results displayed in the user interface view 1500 are automatically tabulated (e.g., using the tabulate module 302 of FIG. 3).

Figure 16:
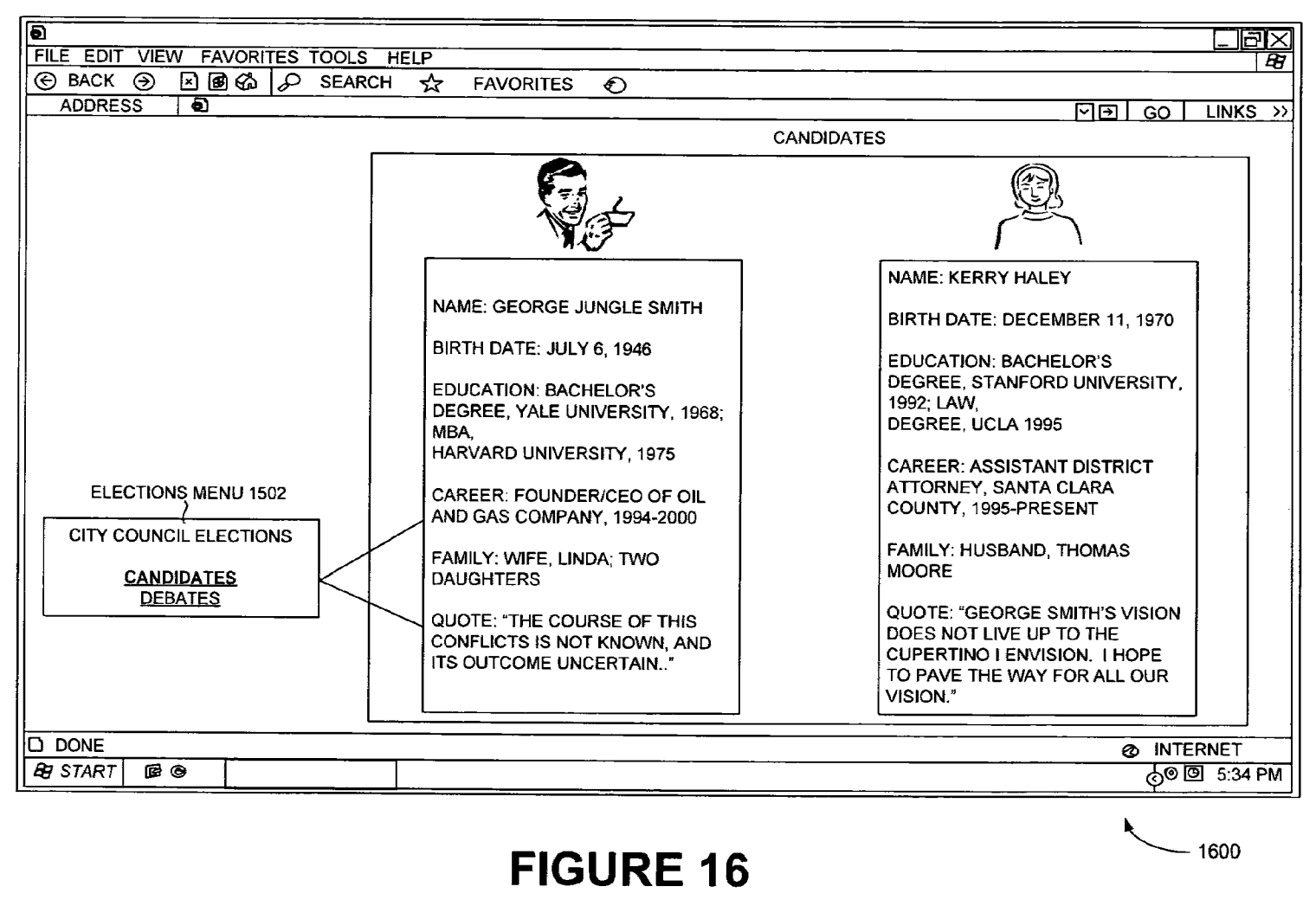

FIG. 16 is a user interface view 1600 displaying candidates running in a City Council election, according to one embodiment. Particularly, FIG. 16 illustrates the elections menu 1502, according to one embodiment.

In the example embodiment illustrated in FIG. 16, the user interface view 1600 displays details of the candidates (e.g., George Jungle Smith and Kerry Haley) running in the Cupertino City Council election. For example, the details include name, birth date, education, elected office, career, family, quotes and visions concerning the election, etc. The details may help out the users 102 of the geo-spatial environment 100 to vote for right candidate in the election.

Figure 17:
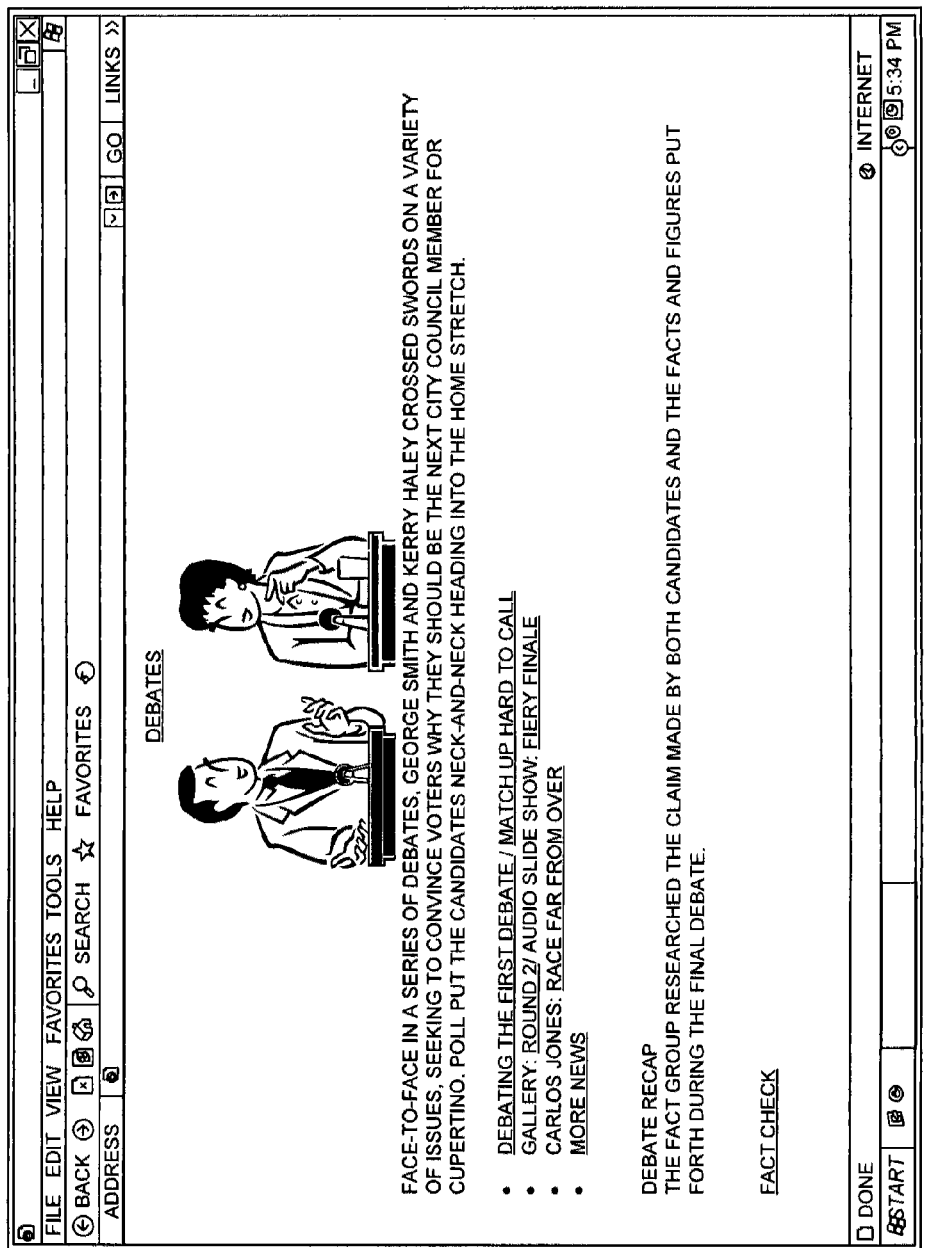
FIG. 17 is a user interface view displaying a political debate associated with the poll in the geo-spatial environment, according to one embodiment.

FIG. 17 is a user interface view 1700 displaying a political debate associated with the poll 404 in the geo-spatial environment 100, according to one embodiment. Particularly, FIG. 17 illustrates the elections menu 1502, according to one embodiment.

In the example embodiment illustrated in FIG. 17, the user interface view 1700 displays the elections menu 1502 associated with the City Council election. The options in the elections menu 1502 include candidates and debates. The political debate between the candidates (e.g., George Jungle Smith and Kerry Haley), seeking to convince the users 102 (e.g., voters) why they should become the next City Council member for Cupertino is displayed in the user interface view 1700 (e.g., through the debates option in the elections menu 1502). The political debate is a face-to-face interaction in a series of debates for the poll 404. The user interface view 1700 also displays options like debate status, debate results, recapture of previous debates and fact check (e.g., may include statistical reference for supporting debate topic, etc.).

Figure 18:
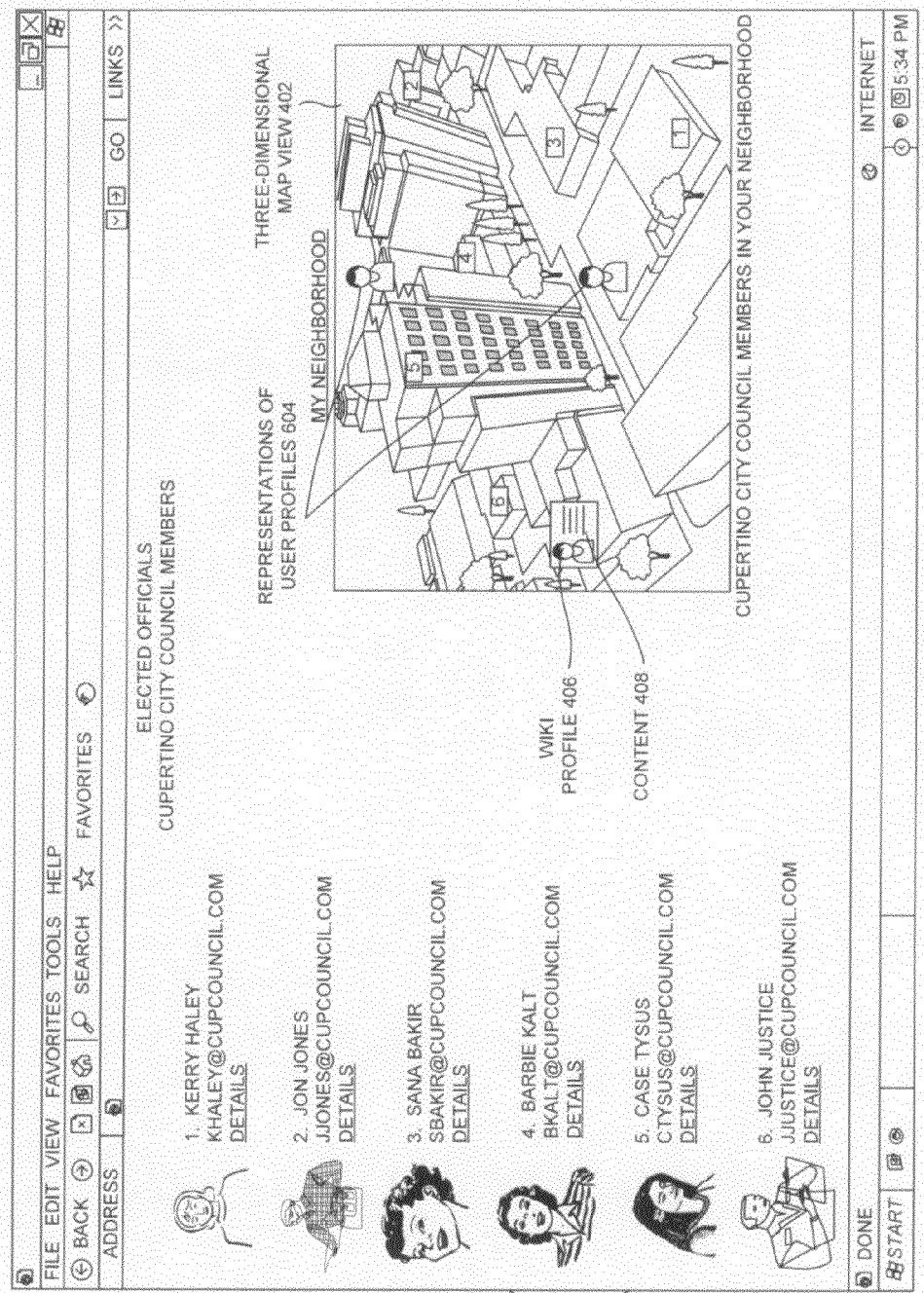
FIG. 18 is a user interface view displaying elected officials in the geo-spatial environment, according to one embodiment.

FIG. 18 is a user interface view 1800 displaying elected officials (e.g., of City Council) in the geo-spatial environment 100, according to one embodiment. Particularly, FIG. 18 illustrates the three-dimensional map view 402, the wiki profile 406, the content 408, the polls menu 602 and the representations of user profiles 604, according to one embodiment.

In the example embodiment illustrated in FIG. 18, the user interface view 1800 displays the three-dimensional map view 402 representing the user profiles 204 associated with Cupertino City Council members in a neighborhood. Details of the elected members (e.g., name of the council member, picture, and contact details such as email) are also displayed in the user interface view 1800. The search option in the polls menu 602 may enable the users 102 to search for the elected officials associated with the Cupertino City Council.

Figure 19:
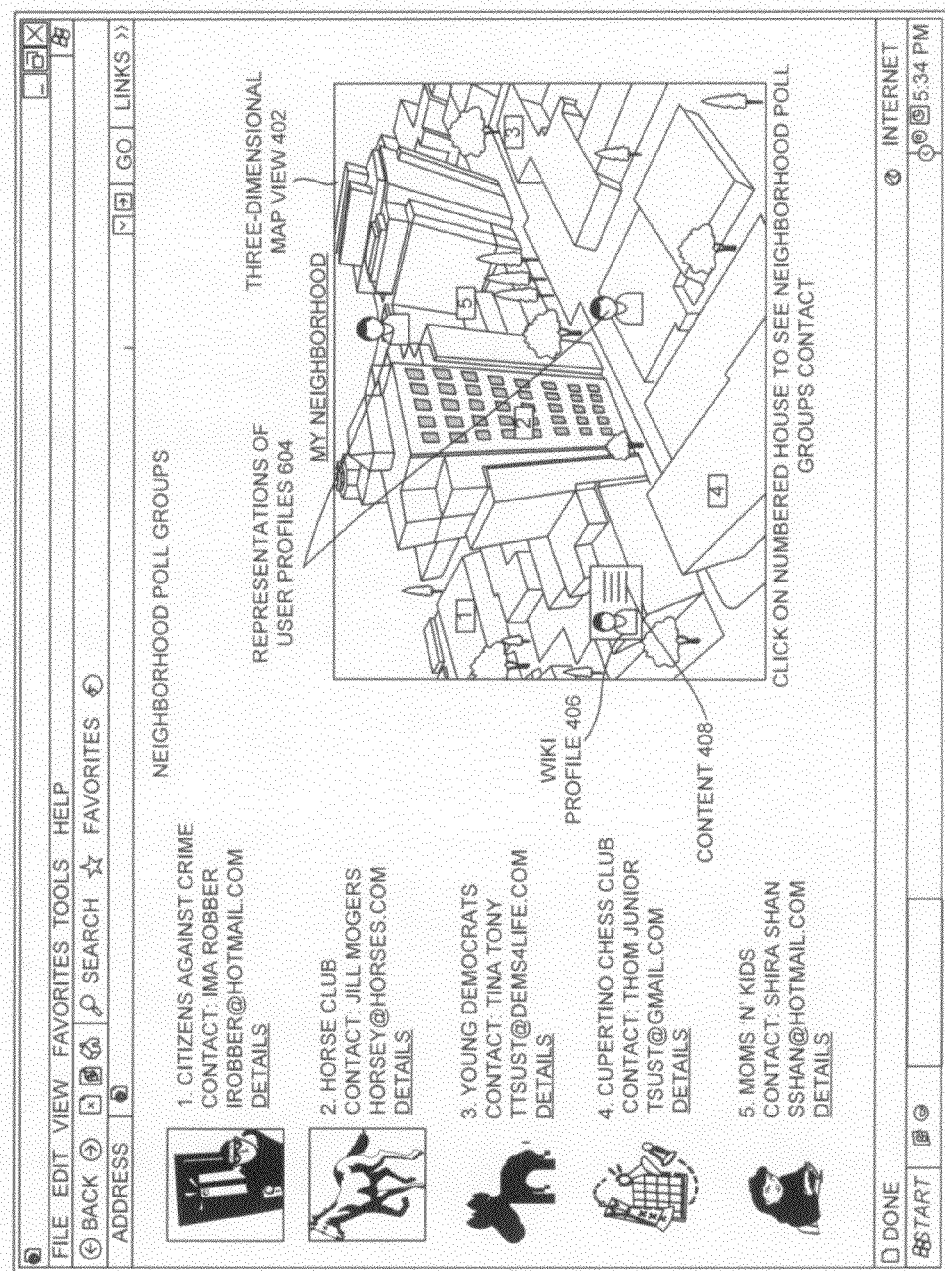
FIG. 19 is a user interface view displaying the poll groups in a neighborhood, according to one embodiment.

FIG. 19 is a user interface view 1900 displaying poll groups in a neighborhood, according to one embodiment. Particularly, FIG. 19 illustrates the three-dimensional map view 402, the wiki profile 406, the content 408, the polls menu 602 and the representations of user profiles 604, according to one embodiment.

In the example embodiment illustrated in FIG. 19, the user interface view 1900 displays the three-dimensional map view 402 representing the poll groups (e.g., Citizens Against Crime, Horse Club, Young Democrats, Cupertino Chess Club, Moms 'N' Kids, etc.) in the neighborhood. The user interface view 1900 also displays details (e.g., name, contact details, etc.) associated with the poll groups. For example, a poll group may include a moderator and members (e.g., the users 102 of the geo-spatial environment 100). The moderator may send polls 404 periodically to the members of the poll group and receive responses from the members.

Figure 20:
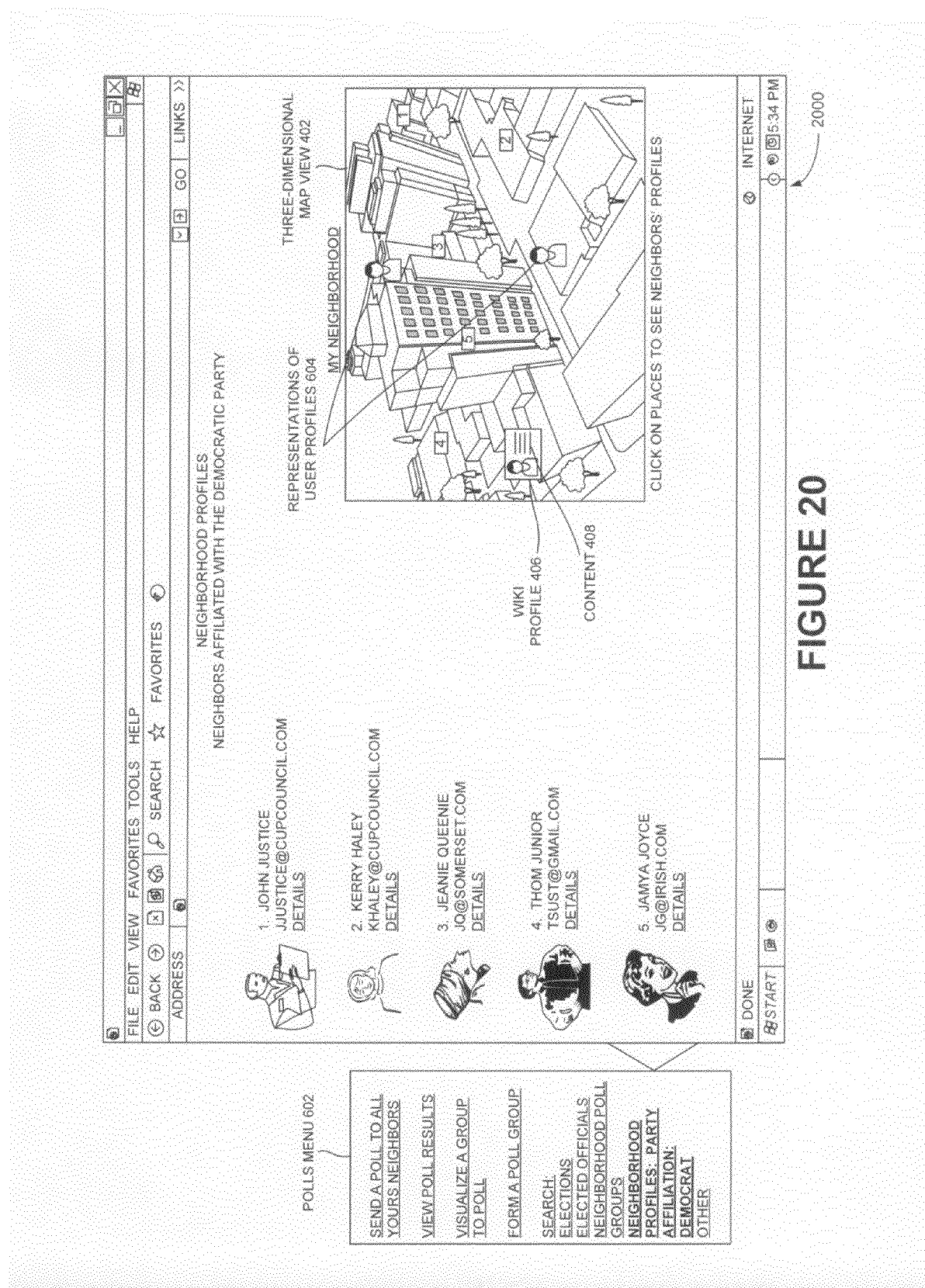
FIG. 20 is a user interface view displaying neighborhood profiles affiliated with a particular party, according to one embodiment.

FIG. 20 is a user interface view 2000 displaying neighborhood profiles affiliated with a particular party, according to one embodiment. Particularly, FIG. 20 illustrates the three-dimensional map view 402, the wiki profile 406, the content 408, the polls menu 602 and the representations of user profiles 604, according to one embodiment.

In the example embodiment illustrated in FIG. 20, the user interface view 2000 displays neighborhood user profiles 204 (e.g., John Justice, Kerry Haley, Jeanie Queenie, Thom Junior, Jamya Joyce, etc.) affiliated with Democratic Party. The three-dimensional map view 402 also represents the neighborhood user profiles 204 at locations associated with the specific geographic location 206 of each user profile 204.

Figure 21:
FIG. 21 is a table view displaying details of the users associated with the poll, according to one embodiment.

FIG. 21 is a table view 2100 displaying details of the users 102 associated with the poll 404, according to one embodiment. Particularly, FIG. 21 illustrates a users field 2102, a moderator field 2104, a poll groups field 2106, a candidate field 2108 and a party affiliation field 2110, according to one embodiment.

The users field 2102 may display an identifier (e.g., a name, a username, a unique key, etc.) associated with the users 102 of the geo-spatial environment 100. The moderator field 2104 may indicate whether or not a user 102 is a moderator for the poll 404. The poll groups field 2106 may display number of poll groups associated with the user 102. The candidate field 2108 may indicate whether or not the user 102 is a candidate associated with the poll 404. The party affiliation field 2110 may display a political party to which the user 102 is affiliated.

In the example embodiment illustrated in FIG. 21, the users field 2102 displays "Erica Lee" in the first row, "George Smith" in the second row and "Kerry Haley" in the third row of the users field column 2102. The moderator field 2104 displays "Yes" in the first row, "No" in the second row and "No" in the third row of the moderator field column 2104 (e.g., Erica Lee is a moderator of a poll group while George Smith and Kerry Haley are not moderators of any poll group). The poll groups field 2106 displays "2" in the first row, "3" in the second row and "0" in the third row of the poll groups field column 2106 (e.g., Erica Lee is associated with 2 poll groups and George Smith is associated with three poll groups while Kerry Haley is not associated with any poll group in the geo-spatial environment 100).

The candidate field 2108 displays "No" in the first row, "Yes" in the second row and "Yes" in the third row of the candidate field column 2108 (e.g., George Smith and Kerry Haley are candidates associated with the poll 404 while Erica Lee is not a candidate). The party affiliation field 2110 displays "Democratic" in the first row, "Republican" in the second row and "Democratic" in the third row of the party affiliation field column 2110 (e.g., Erica Lee and Kerry Haley are affiliated with the Democratic party while George Smith is affiliated with the Republican party).

Figure 22:
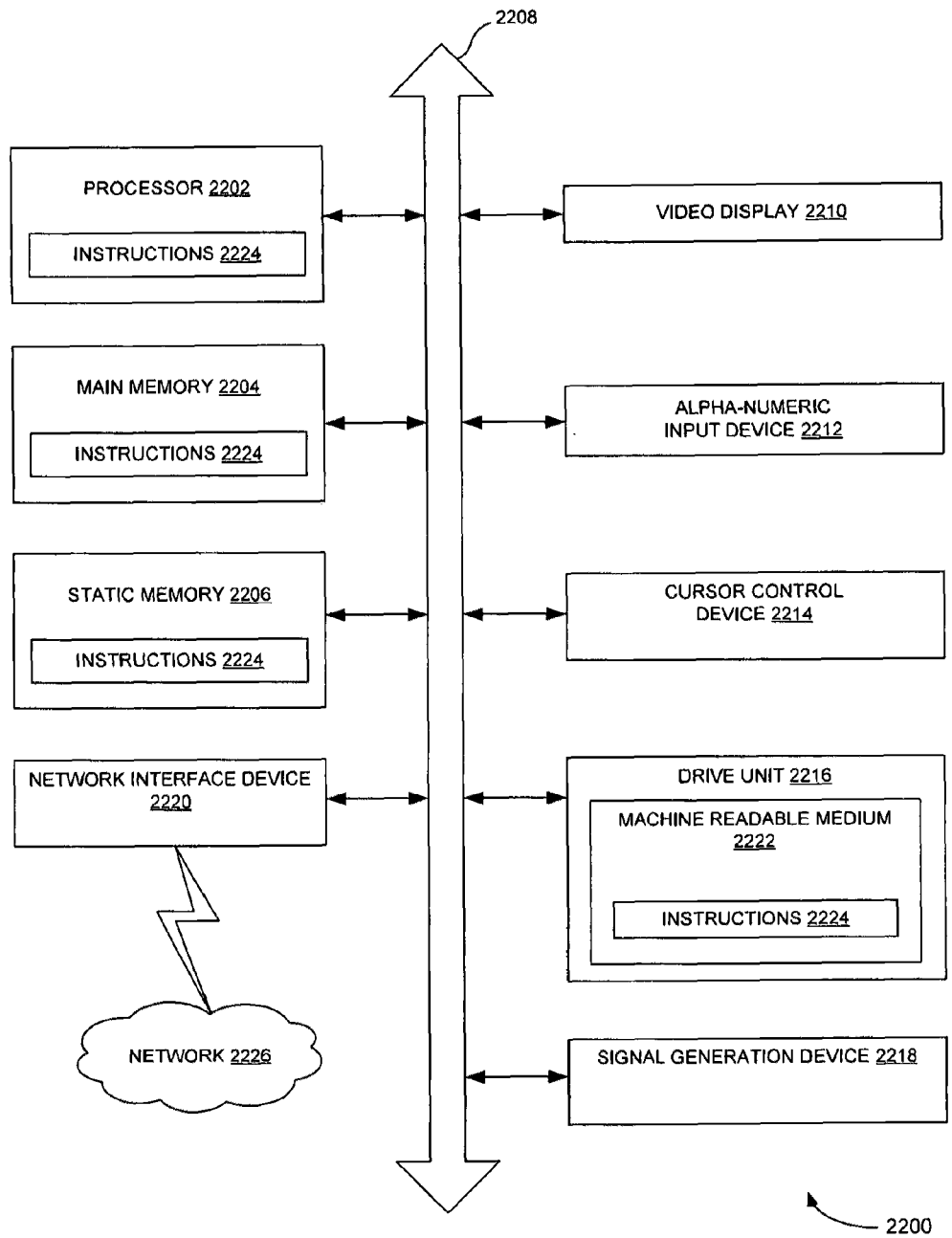
FIG. 22 is a diagrammatic system view of a data processing system in which any of the embodiments disclosed herein may be performed, according to one embodiment.

FIG. 22 is a diagrammatic system view 2200 of a data processing system in which any of the embodiments disclosed herein may be performed, according to one embodiment. Particularly, the diagrammatic system view 2200 of FIG. 22 illustrates a processor 2202, a main memory 2204, a static memory 2206, a bus 2208, a video display 2210, an alpha-numeric input device 2212, a cursor control device 2214, a drive unit 2216, a signal generation device 2218, a network interface device 2220, a machine readable medium 2222, instructions 2224 and a network 2226, according to one embodiment.

The diagrammatic system view 2200 may indicate a personal computer and/or the data processing system in which one or more operations disclosed herein are performed. The processor 2202 may be a microprocessor, a state machine, an application specific integrated circuit, a field programmable gate array, etc. (e.g., Intel® Pentium® processor). The main memory 2204 may be a dynamic random access memory and/or a primary memory of a computer system.

The static memory 2206 may be a hard drive, a flash drive, and/or other memory information associated with the data processing system. The bus 2208 may be an interconnection between various circuits and/or structures of the data processing system. The video display 2210 may provide graphical representation of information on the data processing system. The alpha-numeric input device 2212 may be a keypad, a keyboard and/or any other input device of text (e.g., a special device to aid the physically handicapped).

The cursor control device 2214 may be a pointing device such as a mouse. The drive unit 2216 may be the hard drive, a storage system, and/or other longer term storage subsystem. The signal generation device 2218 may be a bios and/or a functional operating system of the data processing system. The network interface device 2220 may be a device that performs interface functions such as code conversion, protocol conversion and/or buffering required for communication to and from the network 2226. The machine readable medium 2222 may provide instructions on which any of the methods disclosed herein may be performed. The instructions 2224 may provide source code and/or data code to the processor 2202 to enable any one or more operations disclosed herein.

Figure 23A:
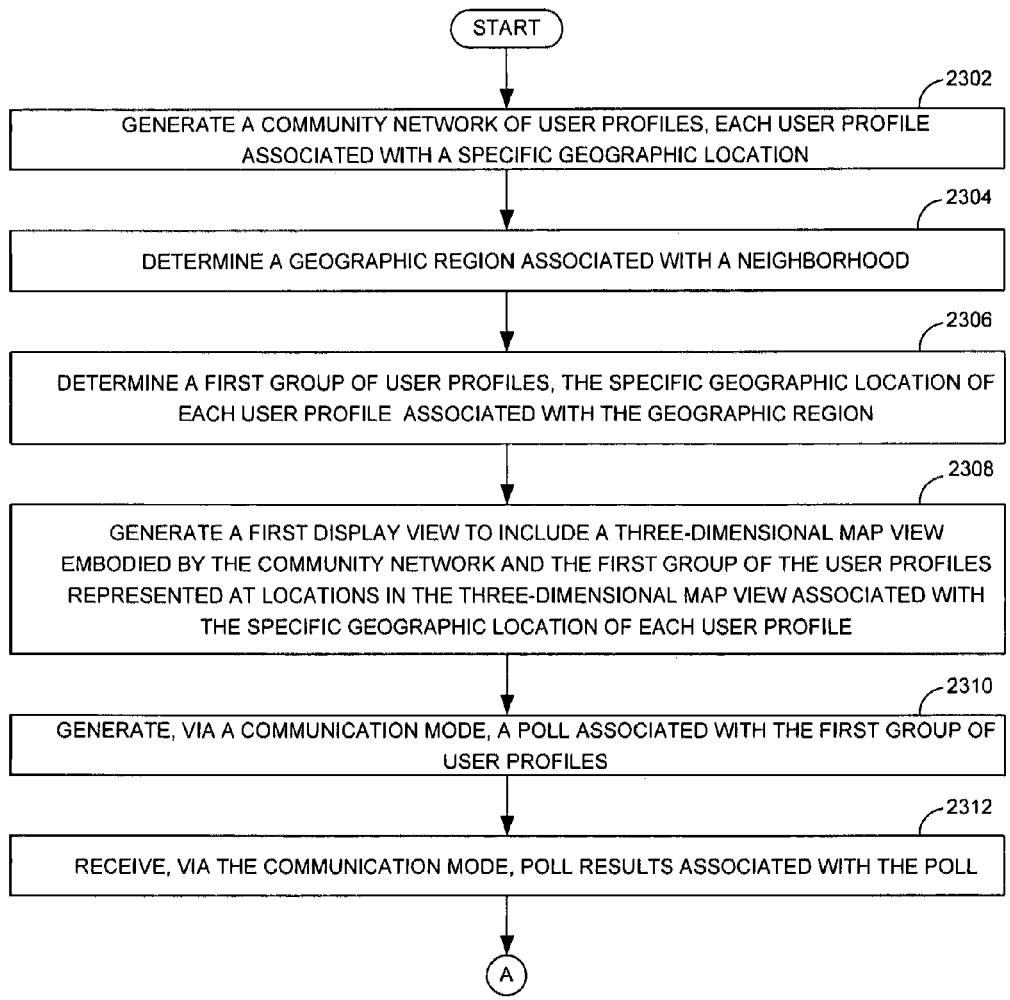
FIG. 23A is a process flow of generating the poll associated with user profiles in the geo-spatial environment, according to one embodiment.

FIG. 23A is a process flow of generating a poll 404 associated with user profiles 204 in a geo-spatial environment (e.g., the geo-spatial environment 100 of FIG. 1), according to one embodiment. In operation 2302, a community network (e.g., the community network 200 of FIG. 2) of user profiles (e.g., the user profiles 204 of of FIG. 3), via the communication mode 410. In operation 2318, a second display view (e.g., the display view 416 of FIG. 4) may be generated (e.g., using the display module 114 of FIG. 1) to include a three-dimensional map view 402 embodied by the community network 200, a second group of user profiles (e.g., the other groups of user profiles 204B of FIG. 4) represented at locations in the three-dimensional map view 402 (e.g., associated with the specific geographic location 206 of each user profile 204), and the poll results 516, each poll result 516 associated with a user profile 204 (e.g., of the second group of user profiles 204B).

In operation 2320, the poll results 516, including respondents' names, a response associated with each respondent, a response category, and/or a percentage associated with the response category (e.g., as illustrated in block 518 of FIG. 5), may be published (e.g., using the publish module 304 of FIG. 3). In operation 2322, a poll group may be visualized (e.g., using the visualize module 306 of FIG. 3). In operation 2324, a geographic region 412 associated with a neighborhood may be determined (e.g., using the geographic region module 110 of FIG. 1).

Figure 23B:
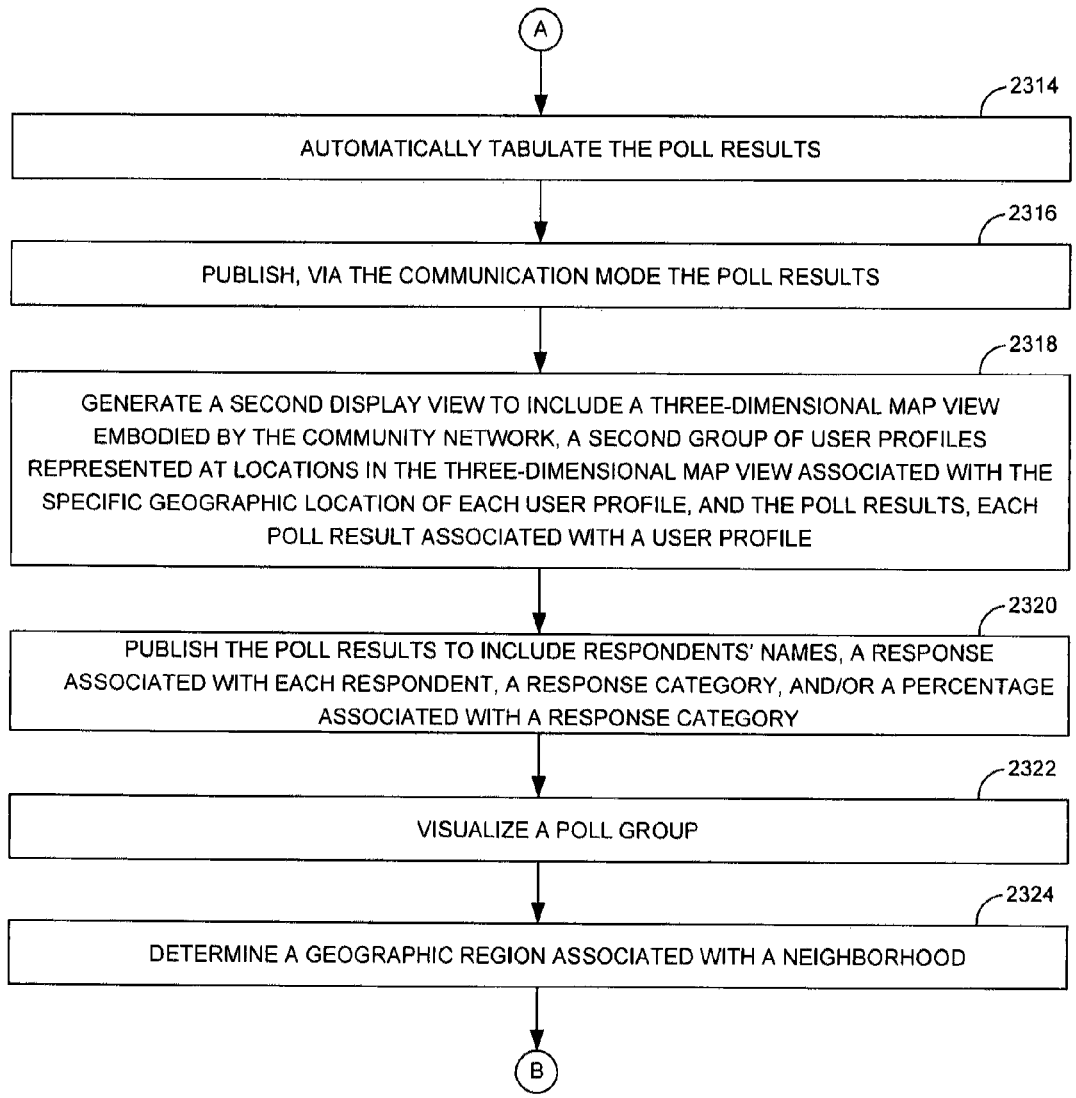
FIG. 23B is a continuation of the process flow of FIG. 23A, illustrating additional processes, according to one embodiment.
Figure 23C:
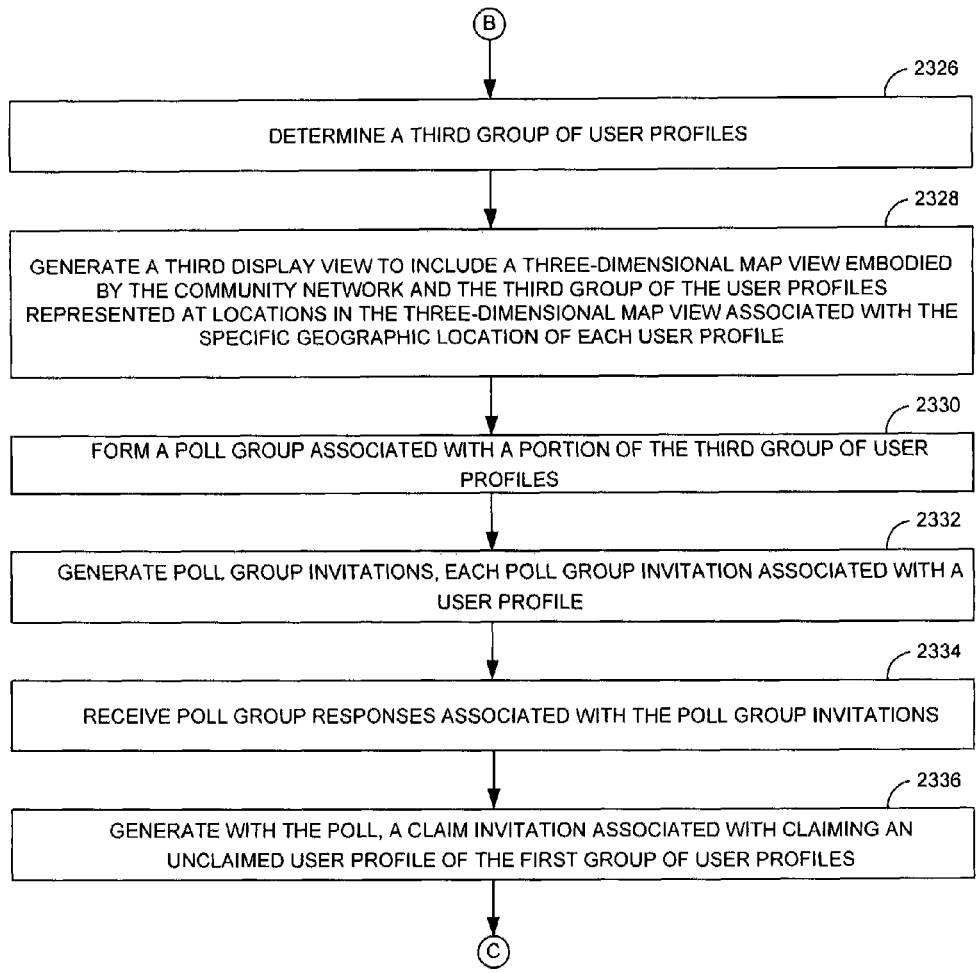
FIG. 23C is a continuation of the process flow of FIG. 23B, illustrating additional processes, according to one embodiment.

FIG. 23C is a continuation of the process flow of FIG. 23B, illustrating additional processes, according to one embodiment. In operation 2326, a third group of user profiles (e.g., the other groups of user profiles 204B of FIG. 4) may be determined (e.g., using the group module 112 of FIG. 1). In operation 2328, a third display view (e.g., the display view 416 of FIG. 4) may be generated (e.g., using the display module 114 of FIG. 1) to include a three-dimensional map view 402 embodied by the community network 200 and the third group of user profiles 204B represented at locations in the three-dimensional map view 402 associated with the specific geographic FIG. 2) may be generated (e.g., using the community network module 106 of FIG. 1), each user profile 204 associated with a specific geographic location (e.g., the specific geographic location 206 of FIG. 2). In operation 2304, a geographic region (e.g., the geographic region 412 of FIG. 4) associated with a neighborhood may be determined (e.g., using the geographic region module 110 of FIG. 1). In operation 2306, a first group of user profiles (e.g., the first group of user profiles 204A of FIG. 4) may be determined (e.g., using the group module 112 of FIG. 1), the specific geographic location 206 of each user profile 204 associated with the geographic region 412.

In operation 2308, a first display view (e.g., the display view 416 of FIG. 4) may be generated (e.g., using the display module 114 of FIG. 1) to include a three-dimensional map view (e.g., the three-dimensional map view 402 of FIG. 4) embodied by the community network 200 and the first group of user profiles 204A represented at locations in the three-dimensional map view 402 associated with the specific geographic location 206 of each user profile 204. In operation 2310, a poll (e.g., the poll 404 of FIG. 4) associated with the first group of user profiles 204A may be generated (e.g., using the poll module 116 of FIG. 1) via a communication mode (e.g., the communication mode 410 FIG. 4). In operation 2312, poll results (e.g., the poll results 516 of FIG. 5) associated with the poll 404 may be received (e.g., through the poll module 116 of FIG. 1) via the communication mode 410.

FIG. 23B is a continuation of the process flow of FIG. 23A, illustrating additional processes, according to one embodiment. In operation 2314, the poll results 516 may be automatically tabulated (e.g., using the tabulate module 302 of FIG. 3). In operation 2316, the poll results 516 may be published (e.g., using the publish module 304 location 206 of each user profile 204. In operation 2330, a poll group associated with a portion of the third group of user profiles 204B may be formed (e.g., using the group generator module 306A of FIG. 3).

In operation 2332, poll group invitations (e.g., the poll group invitation 1302 of FIG. 13) may be generated (e.g., using the group generator module 306A of FIG. 3), each poll group invitation 1302 associated with a user profile 204 (e.g., of the third group of user profiles 204B). In operation 2334, poll group responses associated with the poll group invitations 1302 may be received (e.g., through the group generator module 306A of FIG. 3). In operation 2336, a claim invitation (e.g., the claim invitation 804 of FIG. 8) associated with claiming an unclaimed user profile 204 of the first group of user profiles 204A may be generated (e.g., using the claim invitation module 308 of FIG. 3) with the poll 404.

Figure 23D:
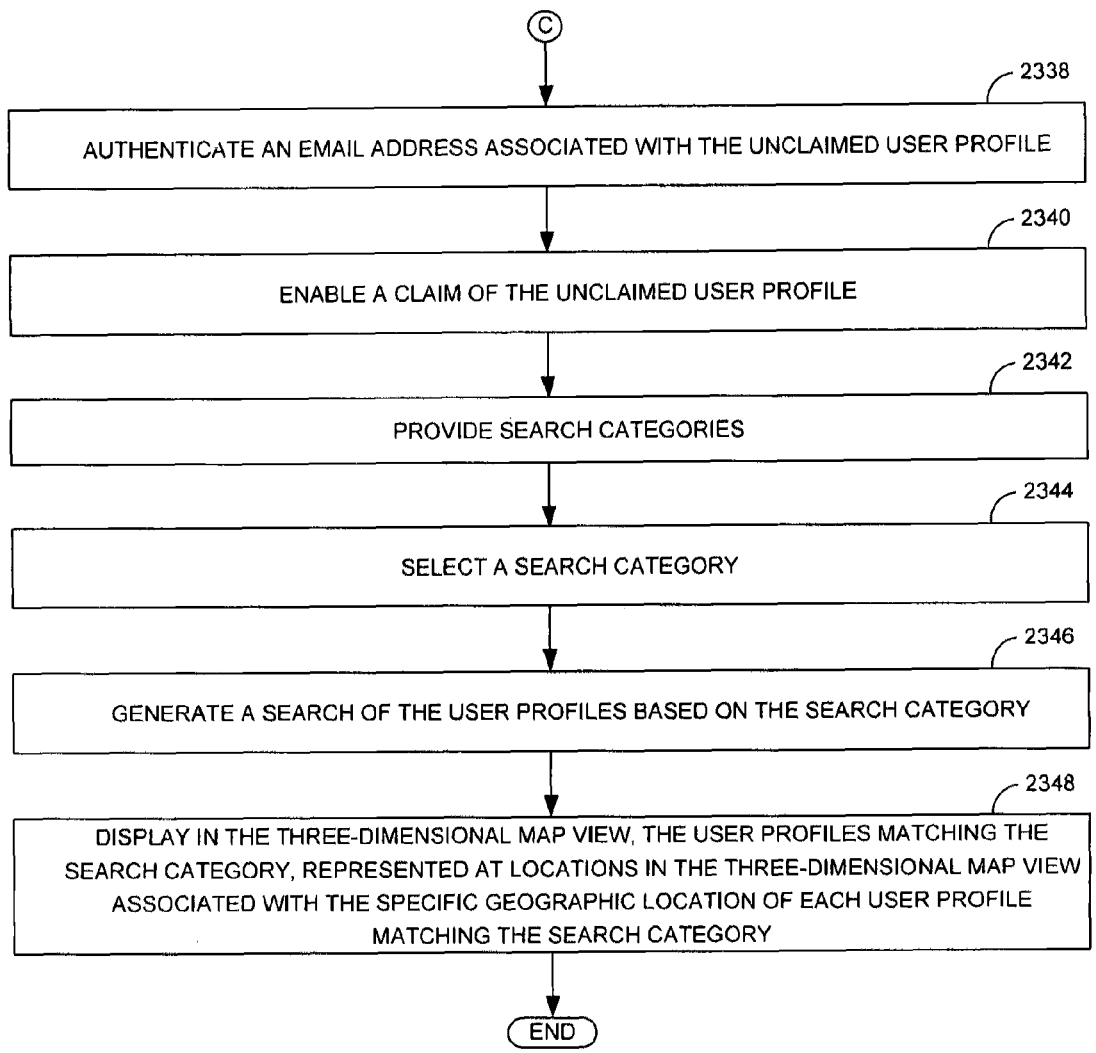
FIG. 23D is a continuation of the process flow of FIG. 23C, illustrating additional processes, according to one embodiment.

FIG. 23D is a continuation of the process flow of FIG. 23C, illustrating additional processes, according to one embodiment. In operation 2338, an email address associated with the unclaimed user profile 204 may be authenticated (e.g., using the claim user profile module 308A of FIG. 3). In operation 2340, a claim of the unclaimed user profile 204 may be enabled (e.g., using the claim user profile module 308A of FIG. 3). In operation 2342, search categories (e.g., the search categories 414 of FIG. 4) may be provided (e.g., through the search module 310 of FIG. 3).

In operation 2344, a search category 414 may be selected (e.g., using the search module 310 of FIG. 3). In operation 2346, a search of the user profiles 204 may be generated (e.g., through the search module 310 of FIG. 3) based on the search category 414. In operation 2348, the user profiles 204 matching the search category 414 may be displayed (e.g., using the display module 114 of FIG. 1) in the three-dimensional map view 402, represented at locations in the three-dimensional map view 402 associated with the specific geographic location 206 of each user profile 204 matching the search category 414.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the various electrical structure and methods may be embodied using transistors, logic gates, and electrical circuits (e.g., Application Specific Integrated Circuitry (ASIC) and/or in Digital Signal Processor (DSP) circuitry). For example, the community network module 106, the map module 108, the geographic region module 110, the group module 112, the display module 114, the poll module 116, additional modules 118, the tabulate module 302, the publish module 304, the webpage module 304A, the visualize module 306, the group generator module 306A, the claim invitation module 308, the claim user profile module 308A, the search module 310, the wiki profile module 312, the append module 314 and other modules of FIGS. 1-23 may be may be enabled using a community network circuit, a map circuit, a geographic region circuit, a group circuit, a display circuit, a poll circuit, additional circuits, a tabulate circuit, a publish circuit, a webpage circuit, a visualize circuit, a group generator circuit, a claim invitation circuit, a claim user profile circuit, a search circuit, a wiki profile circuit, an append circuit and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A computer-implemented method, comprising:
generating, by a processor of a computing device, a community network of user profiles, each user profile of the user profiles associated with a specific geographic location;
determining, using the processor, a geographic region associated with a neighborhood;
determining, using the processor, a first group of user profiles, the specific geographic location of each user profile of the first group of user profiles associated with the geographic region;
generating, using the processor, a first display view to include a three-dimensional map view depicting the community network and the first group of the user profiles represented at locations in the three-dimensional map view associated with the specific geographic location of each user profile of the first group of user profiles;
generating, using the processor, via a communication mode, a poll associated with at least the first group of user profiles;
receiving, using the processor, via the communication mode, poll results associated with the poll from a set of respondents; and
generating, using the processor, a second display view using the three-dimensional map view and including in the three-dimensional map view representations depicting geographic locations of user profiles of the set of respondents, and representations of the poll results, each poll result displayed in association with a corresponding user profile of the set of respondents.

2. The method of claim 1, further comprising automatically tabulating the poll results.

3. The method of claim 1, further comprising publishing the poll results to include at least one of the set of respondents' names, a response associated with each respondent of the set of respondents, a response category, and a percentage associated with a response category.

4. The method of claim 1, further comprising:
generating poll group invitations, each poll group invitation associated with a user profile; and
receiving poll group responses associated with the poll group invitations.

5. The method of claim 1, further comprising generating with the poll, a claim invitation associated with claiming an unclaimed user profile of the first group of user profiles.

6. The method of claim 5, further comprising:
authenticating an email address associated with the unclaimed user profile of the first group of user profiles; and
enabling a claim of the unclaimed user profile of the first group of user profiles.

7. The method of claim 1, further comprising:
providing search categories;
selecting at least one search category of the search categories;
generating a search of the user profiles based on the at least one search category; and
displaying, in the three-dimensional map view, the user profiles matching the at least one search category, represented at locations in the three-dimensional map view associated with the specific geographic location of each user profile matching the at least one search category.

8. The method of claim 7, wherein the search categories include elections, candidates, debates, elected officials, neighborhood groups, and neighbor profiles.

9. The method of claim 1, wherein the poll is associated with a category selected from a group comprising an interest, a political subject, and a neighborhood issue.

10. The method of claim 9, wherein the political subject includes at least one of an election, a political party, a political issue, a platform, a candidate, and a vote.

11. The method of claim 1, wherein the communication mode includes at least one of an online mode and a physical mode.

12. The method of claim 11, wherein the online mode includes at least one of a webpage, an email, an instant message, and a telephone.

13. The method of claim 11, wherein the physical mode includes at least one of a physical mailing and a newspaper.

14. A non-transitory computer readable storage medium embodying a set of instructions that, when executed by a machine, causes the machine to perform generating a community network of user profiles, each user profile of the user profiles associated with a specific geographic location;

determining a geographic region associated with a neighborhood;

determining a first group of user profiles, the specific geographic location of each user profile of the first group of user profiles associated with the geographic region;

generating a first display view to include a three-dimensional map view depicting the community network and the first group of the user profiles represented at locations in the three-dimensional map view associated with the specific geographic location of each user profile of the first group of user profiles;

generating, via a communication mode, a poll associated with at least the first group of user profiles;

receiving, via the communication mode, poll results associated with the poll from a set of respondents; and generating a second display view using the three-dimensional map view and including in the three-dimensional map view representations depicting geographic locations of user profiles of the set of respondents, and representations of the poll results, each poll result displayed in association with a corresponding user profile of the set of respondents.

15. A system, comprising:

a memory configured to store executable code; and a processor operably coupled to the memory and configured to execute the executable code such that the system:

generates a community network of user profiles, each user profile of the user profiles associated with a specific geographic location;

determines a geographic region associated with a neighborhood;

determines a first group of user profiles, the specific geographic location of each user profile of the first group of user profiles associated with the geographic region;

generates a first display view to include a three-dimensional map view depicting the community network and the first group of the user profiles represented at locations in the three-dimensional map view associated with the specific geographic location of each user profile of the first group of user profiles;

generates a poll associated with at least the first group of user profiles;

receives poll results associated with the poll from a set of respondents;

generates a second display view using the three-dimensional map view and includes in the three-dimensional map view representations depicting geographic locations of user profiles of the set of respondents, and representations of the poll results, each poll result displayed in association with a corresponding user profile of the set of respondents.

16. The system of claim 15, further comprising a tabulate module of the geo-spatial environment to automatically tabulate the poll results.

* * * * *

UNITED STATES PATENT AND TRADEMARK OFFICE
CERTIFICATE OF CORRECTION

PATENT NO. : 8,204,776 B2  Page 1 of 1
APPLICATION NO. : 11/897088
DATED : June 19, 2012
INVENTOR(S) : Raj Vasant Abhyanker It is certified that error appears in the above-identified patent and that said Letters Patent is hereby corrected as shown below:

On first page, field (57), under "ABSTRACT", in column 2, line 8, delete "play" and insert
-- display --, therefor.

Signed and Sealed this
Twenty-eighth Day of August, 2012

David J. Kappos
*Director of the United States Patent and Trademark Office*